US012401480B2

(12) United States Patent
Bhattad et al.

(10) Patent No.: US 12,401,480 B2
(45) Date of Patent: Aug. 26, 2025

(54) SEMI-PERSISTENT SCHEDULING DEACTIVATION FOR INTERLACE RESOURCE ALLOCATION

(71) Applicant: Qualcomm Incorporated, San Diego, CA (US)

(72) Inventors: Kapil Bhattad, Bangalore (IN); Xiaoxia Zhang, San Diego, CA (US); Pravjyot Singh Deogun, Bengaluru (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/768,395

(22) PCT Filed: Oct. 27, 2020

(86) PCT No.: PCT/US2020/057569
§ 371 (c)(1),
(2) Date: Apr. 12, 2022

(87) PCT Pub. No.: WO2021/091729
PCT Pub. Date: May 14, 2021

(65) Prior Publication Data
US 2024/0129094 A1 Apr. 18, 2024

(30) Foreign Application Priority Data

Nov. 4, 2019 (IN) .............................. 201941044583

(51) Int. Cl.
H04L 5/00 (2006.01)
H04W 72/11 (2023.01)
(Continued)

(52) U.S. Cl.
CPC .......... *H04L 5/0053* (2013.01); *H04L 5/0094* (2013.01); *H04W 72/11* (2023.01); *H04W 72/232* (2023.01); *H04W 72/20* (2023.01)

(58) Field of Classification Search
CPC ... H04L 5/0053; H04L 5/0094; H04L 5/0032; H04L 5/0098; H04L 27/26025;
(Continued)

(56) References Cited

U.S. PATENT DOCUMENTS

2010/0118807 A1 5/2010 Seo et al.
2018/0054292 A1* 2/2018 Yang ..................... H04L 5/0042
(Continued)

FOREIGN PATENT DOCUMENTS

CN 108631974 A 10/2018
WO WO-2018161856 A1 9/2018
(Continued)

OTHER PUBLICATIONS

Ericsson: "UL Signals and Channels for NR-U", 3GPP Draft, 3GPP TSG-RAN WG1 Meeting #97, R1-1907453 UL Signals and Channels for NR-U, 3rd Generation Partnership Project (3GPP), Mobile Competence Centre, 650, Route Des Lucioles, F-06921 Sophia-Antipolis Cedex, France, vol. RAN WG1, No. Reno, NV, USA, May 13, 2019-May 17, 2019, May 13, 2019 (May 13, 2019), XP051728884, pp. 1-17, Retrieved from the Internet: URL:http://www.3gpp.org/ftp/Meetings%5F3GPP%5FSYNC/RAN1/Docs/R1%2D1907453%2Ezip [retrieved on May 13, 2019] Section 2.2.
(Continued)

*Primary Examiner* — Oussama Roudani
(74) *Attorney, Agent, or Firm* — QUALCOMM Incorporated

(57) ABSTRACT

Methods, systems, and devices for wireless communications are described. A user equipment may receive a first control message associated with a first, periodic resource grant and
(Continued)

including a first resource allocation field associated with a first subcarrier spacing. The user equipment may receive a second control message that includes the first resource allocation field at a first value. The user equipment may deactivate the first resource grant based on the first value and the first subcarrier spacing. The user equipment may receive a third control message associated with a second, periodic resource grant and including a second resource allocation field associated with a second subcarrier spacing. The user equipment may receive a fourth control message that includes a second resource allocation field at a second value different from the first value. The user equipment may deactivate the second resource grant based on the second value and the second subcarrier spacing.

28 Claims, 16 Drawing Sheets

(51) Int. Cl.
*H04W 72/20* (2023.01)
*H04W 72/232* (2023.01)

(58) Field of Classification Search
CPC . H04L 27/2605; H04W 72/11; H04W 72/232; H04W 72/23; H04W 72/20
See application file for complete search history.

(56) References Cited

U.S. PATENT DOCUMENTS

| | | | |
|---|---|---|---|
| 2018/0139734 A1* | 5/2018 | Babaei | H04W 72/23 |
| 2018/0183551 A1* | 6/2018 | Chou | H04W 74/006 |
| 2019/0222349 A1* | 7/2019 | Gao | H04B 7/0645 |
| 2019/0246380 A1 | 8/2019 | Dinan | |
| 2019/0253197 A1 | 8/2019 | Babaei et al. | |
| 2020/0037314 A1* | 1/2020 | Xiong | H04L 1/1812 |
| 2020/0214076 A1* | 7/2020 | Babaei | H04W 76/27 |
| 2022/0030607 A1* | 1/2022 | Liu | H04W 72/1273 |

FOREIGN PATENT DOCUMENTS

| | | |
|---|---|---|
| WO | WO-2019084570 A1 | 5/2019 |
| WO | WO-2019138360 A1 | 7/2019 |

OTHER PUBLICATIONS

International Search Report and Written Opinion—PCT/US2020/057569—ISA/EPO—Jan. 25, 2021.

* cited by examiner

SEMI-PERSISTENT SCHEDULING DEACTIVATION FOR INTERLACE RESOURCE ALLOCATION

CROSS REFERENCE TO RELATED APPLICATIONS

The present Application is a 371 national stage filing of International PCT Application No. PCT/US2020/057569 by Bhattad et al., entitled "SEMI-PERSISTENT SCHEDULING DEACTIVATION FOR INTERLACE RESOURCE ALLOCATION," filed Oct. 27, 2020; and claims priority to India Patent Application No. 201941044583 by Bhattad et al., entitled "SEMI-PERSISTENT SCHEDULING DEACTIVATION FOR INTERLACE RESOURCE ALLOCATION," filed Nov. 4, 2019, each of which is assigned to the assignee hereof, and each of which is expressly incorporated by reference in its entirety herein.

FIELD OF TECHNOLOGY

The following relates generally to wireless communications and more specifically to resource deactivation for interlace resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may configure a UE with periodic semi-persistent scheduling (SPS) or configured-grant (CG) resources. The UE may use the SPS or CG resources to receive signaling from or transmit signaling to the base station. For instance, the UE may use the SPS resources to receive a physical downlink shared channel (PDSCH) transmission from the base station or may use the CG resources to transmit a physical uplink shared channel (PUSCH) transmission to the base station.

SUMMARY

The present disclosure relates to methods, systems, devices, and apparatuses that support resource deactivation for interlace resource allocation. Generally, the described techniques provide for a user equipment (UE) to receive a first control message associated with a periodic resource grant, where the first control message includes a resource allocation field and where a first value of the resource allocation field allocates a first one or more periodic resources of a set of periodic resources. The UE may transmit or receive signaling over the one or more periodic resources. The UE may receive a second control message that includes the resource allocation field and at least one other field after transmitting or receiving the signaling, where the resource allocation field of the second control message includes a second value. The UE may deactivate the periodic resource grant based on the second value of the resource allocation field and a third value of the at least one other field.

A method for wireless communication is described. The method may include receiving a first control message allocating a first periodic resource grant and including a first resource allocation field associated with a first subcarrier spacing, where each bit of the first resource allocation field is associated with allocation of a periodic resource of a first set of periodic resources, receiving a second control message that includes the first resource allocation field, where the first resource allocation field of the second control message includes a first value, deactivating the first periodic resource grant based on the first value of the first resource allocation field and the first subcarrier spacing, receiving a third control message allocating a second periodic resource grant and including a second resource allocation field associated with a second subcarrier spacing, where each bit of the second resource allocation field is associated with allocation of a periodic resource of a second set of periodic resources, receiving a fourth control message that includes the second resource allocation field, where the second resource allocation field of the fourth control message includes a second value different from the first value of the first resource allocation field, and deactivating the second periodic resource grant based on the second value of the second resource allocation field and the second subcarrier spacing.

An apparatus for wireless communication is described. The apparatus may include a processor, memory in electronic communication with the processor, and instructions stored in the memory. The instructions may be executable by the processor to cause the apparatus to receive a first control message allocating a first periodic resource grant and including a first resource allocation field associated with a first subcarrier spacing, where each bit of the first resource allocation field is associated with allocation of a periodic resource of a first set of periodic resources, receive a second control message that includes the first resource allocation field, where the first resource allocation field of the second control message includes a first value, deactivate the first periodic resource grant based on the first value of the first resource allocation field and the first subcarrier spacing, receive a third control message allocating a second periodic resource grant and including a second resource allocation field associated with a second subcarrier spacing, where each bit of the second resource allocation field is associated with allocation of a periodic resource of a second set of periodic resources, receive a fourth control message that includes the second resource allocation field, where the second resource allocation field of the fourth control message includes a second value different from the first value of the first resource allocation field, and deactivate the second periodic resource grant based on the second value of the second resource allocation field and the second subcarrier spacing.

Another apparatus for wireless communication is described. The apparatus may include means for receiving a first control message allocating a first periodic resource grant and including a first resource allocation field associated with a first subcarrier spacing, where each bit of the first resource allocation field is associated with allocation of a periodic resource of a first set of periodic resources, means for receiving a second control message that includes the first resource allocation field, where the first resource allocation field of the second control message includes a first value, means for deactivating the first periodic resource grant based on the first value of the first resource allocation field and the first subcarrier spacing, means for receiving a third control message allocating a second periodic resource grant and including a second resource allocation field associated with a second subcarrier spacing, where each bit of the second resource allocation field is associated with allocation of a periodic resource of a second set of periodic resources, means for receiving a fourth control message that includes the second resource allocation field, where the second resource allocation field of the fourth control message includes a second value different from the first value of the first resource allocation field, and means for deactivating the second periodic resource grant based on the second value of the second resource allocation field and the second subcarrier spacing.

A non-transitory computer-readable medium storing code for wireless communication is described. The code may include instructions executable by a processor to receive a first control message allocating a first periodic resource grant and including a first resource allocation field associated with a first subcarrier spacing, where each bit of the first resource allocation field is associated with allocation of a periodic resource of a first set of periodic resources, receive a second control message that includes the first resource allocation field, where the first resource allocation field of the second control message includes a first value, deactivate the first periodic resource grant based on the first value of the first resource allocation field and the first subcarrier spacing, receive a third control message allocating a second periodic resource grant and including a second resource allocation field associated with a second subcarrier spacing, where each bit of the second resource allocation field is associated with allocation of a periodic resource of a second set of periodic resources, receive a fourth control message that includes the second resource allocation field, where the second resource allocation field of the fourth control message includes a second value different from the first value of the first resource allocation field, and deactivate the second periodic resource grant based on the second value of the second resource allocation field and the second subcarrier spacing.

In some examples of the method, apparatuses, and non-transitory computer-readable medium described herein, a third value of the first resource allocation field for the first control message allocates a first one or more periodic resources of the first plurality of periodic resources, and the method, apparatuses, and non-transitory computer-readable medium described herein may further include operations, features, means, or instructions for receiving a fifth control message associated with a third periodic resource grant, the fifth control message including a fourth value for the first resource allocation field that allocates a second one or more periodic resources of a third set of periodic resources, and transmitting or receiving signaling over the second one or more periodic resources.

Some examples of the method, apparatuses, and non-transitory computer-readable medium described herein may further include operations, features, means, or instructions for identifying a field of the second control message indicating whether to deactivate the first periodic resource grant, the third periodic resource grant, or both, where the deactivating the first periodic resource grant may be based on the field.

In some examples of the method, apparatuses, and non-transitory computer-readable medium described herein, one of the first one or more periodic resources and the second one or more periodic resources include downlink semi-persistent scheduling resources and where the other of the first one or more periodic resources and the second one or more periodic resources include uplink configured-grant resources.

In some examples of the method, apparatuses, and non-transitory computer-readable medium described herein, the second control message may include at least one other field that includes a third value, and the method, apparatuses, and non-transitory computer-readable medium may include operations, features, means, or instructions for receiving a fifth control message including the first resource allocation field and the at least one other field, where the first resource allocation field of the fifth control message includes a fourth value and the at least one other field of the fifth control message includes a fifth value, and where the fourth value of the first resource allocation field of the fifth control message may be the same as the first value of the first resource allocation field of the second control message, and the fifth value of the at least one other field of the fifth control message may be different from the third value of the at least one other field of the second control message, and transmitting or receiving signaling associated with the first periodic resource grant after receiving the fifth control message and before receiving the second control message based on the fifth value of the at least one other field of the fifth control message being different from the third value of the at least one other field of the second control message.

In some examples of the method, apparatuses, and non-transitory computer-readable medium described herein, the at least one other field includes a hybrid automatic repeat request process number field, a redundancy version field, a new data indicator field, a transmission power control field, a time-domain assignment field, or any combination thereof.

In some examples of the method, apparatuses, and non-transitory computer-readable medium described herein, the deactivating the first periodic resource grant may be based on each bit of the first value of the first resource allocation field of the second control message corresponding to a deallocated condition for the respective periodic resource of the first set of periodic resources.

In some examples of the method, apparatuses, and non-transitory computer-readable medium described herein, the deactivating the first periodic resource grant may be based on each bit of the first value of the first resource allocation field of the second control message corresponding to an allocated condition for the respective periodic resource of the first set of periodic resources.

In some examples of the method, apparatuses, and non-transitory computer-readable medium described herein, the deactivating the first periodic resource grant may be based on a type of resource allocation associated with the first resource allocation field.

In some examples of the method, apparatuses, and non-transitory computer-readable medium described herein, the deactivating the first periodic resource grant may be based on the second control message including a configured scheduling radio network temporary identifier scrambled with a cyclic redundancy check.

In some examples of the method, apparatuses, and non-transitory computer-readable medium described herein, the first control message and the second control message each include downlink control information (DCI) that schedules an uplink transmission or a downlink transmission.

In some examples of the method, apparatuses, and non-transitory computer-readable medium described herein, each periodic resource of the first plurality of periodic resources and each periodic resource of the second plurality of periodic resources comprises an interlaced resource.

A method for wireless communication is described. The method may include transmitting, to a UE, a first control message that indicates to activate a first periodic resource grant, the first control message including a first resource allocation field associated with a first subcarrier spacing, where each bit of the first resource allocation field is associated with allocation of a periodic resource of a first set of periodic resources, transmitting, to the UE, a second control message that includes the first resource allocation field, where the first resource allocation field of the second control message includes a first value, and where the second control message indicates to deactivate the first periodic resource grant based on the first value of the first resource allocation field and the first subcarrier spacing, transmitting, to the UE, a third control message that indicates to activate a second periodic resource grant, the third control message including a second resource allocation field associated with a second subcarrier spacing, where each bit of the second resource allocation field is associated with allocation of a periodic resource of a second set of periodic resources, and transmitting, to the UE, a fourth control message that includes the second resource allocation field, where the second resource allocation field of the second control message includes a second value different from the first value of the first resource allocation field, and where the fourth control message indicates to deactivate the second periodic resource grant based on the second value of the second resource allocation field and the second subcarrier spacing.

An apparatus for wireless communication is described. The apparatus may include a processor, memory in electronic communication with the processor, and instructions stored in the memory. The instructions may be executable by the processor to cause the apparatus to transmit, to a UE, a first control message that indicates to activate a first periodic resource grant, the first control message including a first resource allocation field associated with a first subcarrier spacing, where each bit of the first resource allocation field is associated with allocation of a periodic resource of a first set of periodic resources, transmit, to the UE, a second control message that includes the first resource allocation field, where the first resource allocation field of the second control message includes a first value, and where the second control message indicates to deactivate the first periodic resource grant based on the first value of the first resource allocation field and the first subcarrier spacing, transmit, to the UE, a third control message that indicates to activate a second periodic resource grant, the third control message including a second resource allocation field associated with a second subcarrier spacing, where each bit of the second resource allocation field is associated with allocation of a periodic resource of a second set of periodic resources, and transmit, to the UE, a fourth control message that includes the second resource allocation field, where the second resource allocation field of the second control message includes a second value different from the first value of the first resource allocation field, and where the fourth control message indicates to deactivate the second periodic resource grant based on the second value of the second resource allocation field and the second subcarrier spacing.

Another apparatus for wireless communication is described. The apparatus may include means for transmitting, to a UE, a first control message that indicates to activate a first periodic resource grant, the first control message including a first resource allocation field associated with a first subcarrier spacing, where each bit of the first resource allocation field is associated with allocation of a periodic resource of a first set of periodic resources, means for transmitting, to the UE, a second control message that includes the first resource allocation field, where the first resource allocation field of the second control message includes a first value, and where the second control message indicates to deactivate the first periodic resource grant based on the first value of the first resource allocation field and the first subcarrier spacing, means for transmitting, to the UE, a third control message that indicates to activate a second periodic resource grant, the third control message including a second resource allocation field associated with a second subcarrier spacing, where each bit of the second resource allocation field is associated with allocation of a periodic resource of a second set of periodic resources, and means for transmitting, to the UE, a fourth control message that includes the second resource allocation field, where the second resource allocation field of the second control message includes a second value different from the first value of the first resource allocation field, and where the fourth control message indicates to deactivate the second periodic resource grant based on the second value of the second resource allocation field and the second subcarrier spacing.

A non-transitory computer-readable medium storing code for wireless communication is described. The code may include instructions executable by a processor to transmit, to a UE, a first control message that indicates to activate a first periodic resource grant, the first control message including a first resource allocation field associated with a first subcarrier spacing, where each bit of the first resource allocation field is associated with allocation of a periodic resource of a first set of periodic resources, transmit, to the UE, a second control message that includes the first resource allocation field, where the first resource allocation field of the second control message includes a first value, and where the second control message indicates to deactivate the first periodic resource grant based on the first value of the first resource allocation field and the first subcarrier spacing, transmit, to the UE, a third control message that indicates to activate a second periodic resource grant, the third control message including a second resource allocation field associated with a second subcarrier spacing, where each bit of the second resource allocation field is associated with allocation of a periodic resource of a second set of periodic resources, and transmit, to the UE, a fourth control message that includes the second resource allocation field, where the second resource allocation field of the second control message includes a second value different from the first value of the first resource allocation field, and where the fourth control message indicates to deactivate the second periodic resource grant based on the second value of the second resource allocation field and the second subcarrier spacing.

In some examples of the method, apparatuses, and non-transitory computer-readable medium described herein, a third value of the first resource allocation field for the first control message allocates a first one or more periodic resources of the first plurality of periodic resources, and the method, apparatuses, and non-transitory computer-readable medium described herein may further include operations, features, means, or instructions for transmitting, to the UE, a fifth control message that indicates to activate a third periodic resource grant and that includes the first resource allocation field, where the first resource allocation field of the fifth control message includes a fourth value that allocates a second one or more periodic resources of a second set of resources, and receiving or transmitting signaling over the second one or more periodic resources before transmitting the second control message.

In some examples of the method, apparatuses, and non-transitory computer-readable medium described herein, the second control message includes a field indicating whether to deactivate the first periodic resource grant, the third periodic resource grant, or both.

In some examples of the method, apparatuses, and non-transitory computer-readable medium described herein, one of the first one or more periodic resources and the second one or more periodic resources include downlink semi-persistent scheduling resources and where the other of the first one or more periodic resources and the second one or more periodic resources include uplink configured-grant resources.

In some examples of the method, apparatuses, and non-transitory computer-readable medium described herein, the second control message may include at least one other field that includes a third value, and the method, apparatuses, and non-transitory computer-readable medium may include operations, features, means, or instructions for transmitting a fifth control message that includes the first resource allocation field and the at least one other field before transmitting the second control message, where the first resource allocation field of the fifth control message includes a fourth value and the at least one other field of the fifth control message includes a fifth value, and where the fourth value of the fifth control message may be the same as the first value of the second control message, and the fifth value of the at least one other field of the fifth control message may be different from the third value of the at least one other field of the second control message, and receiving or transmitting signaling associated with the first periodic resource grant after transmitting the fifth control message and before transmitting the second control message based on the fifth value of the at least one other field of the fifth control message being different from the third value of the at least one other field of the second control message.

In some examples of the method, apparatuses, and non-transitory computer-readable medium described herein, the second control message indicates to deactivate the first periodic resource grant based on each bit of the first value of the first resource allocation field of the second control message corresponding to a deallocated condition for the respective periodic resource of the first set of periodic resources.

In some examples of the method, apparatuses, and non-transitory computer-readable medium described herein, the second control message indicates to deactivate the first periodic resource grant based on each bit of the first value of the first resource allocation field of the second control message corresponding to an allocated condition for the respective periodic resource of the first set of periodic resources.

In some examples of the method, apparatuses, and non-transitory computer-readable medium described herein, the second control message indicates to deactivate the first periodic resource grant based on a type of resource allocation associated with the first resource allocation field.

In some examples of the method, apparatuses, and non-transitory computer-readable medium described herein, the second control message indicates to deactivate the first periodic resource grant based on the second control message including a configured scheduling radio network temporary identifier scrambled with a cyclic redundancy check.

In some examples of the method, apparatuses, and non-transitory computer-readable medium described herein, the first control message and the second control message each include DCI that schedules an uplink transmission or a downlink transmission.

In some examples of the method, apparatuses, and non-transitory computer-readable medium described herein, each periodic resource of the first plurality of periodic resources and each periodic resource of the second plurality of periodic resources comprises an interlaced resource.

DETAILED DESCRIPTION

Figure 1:
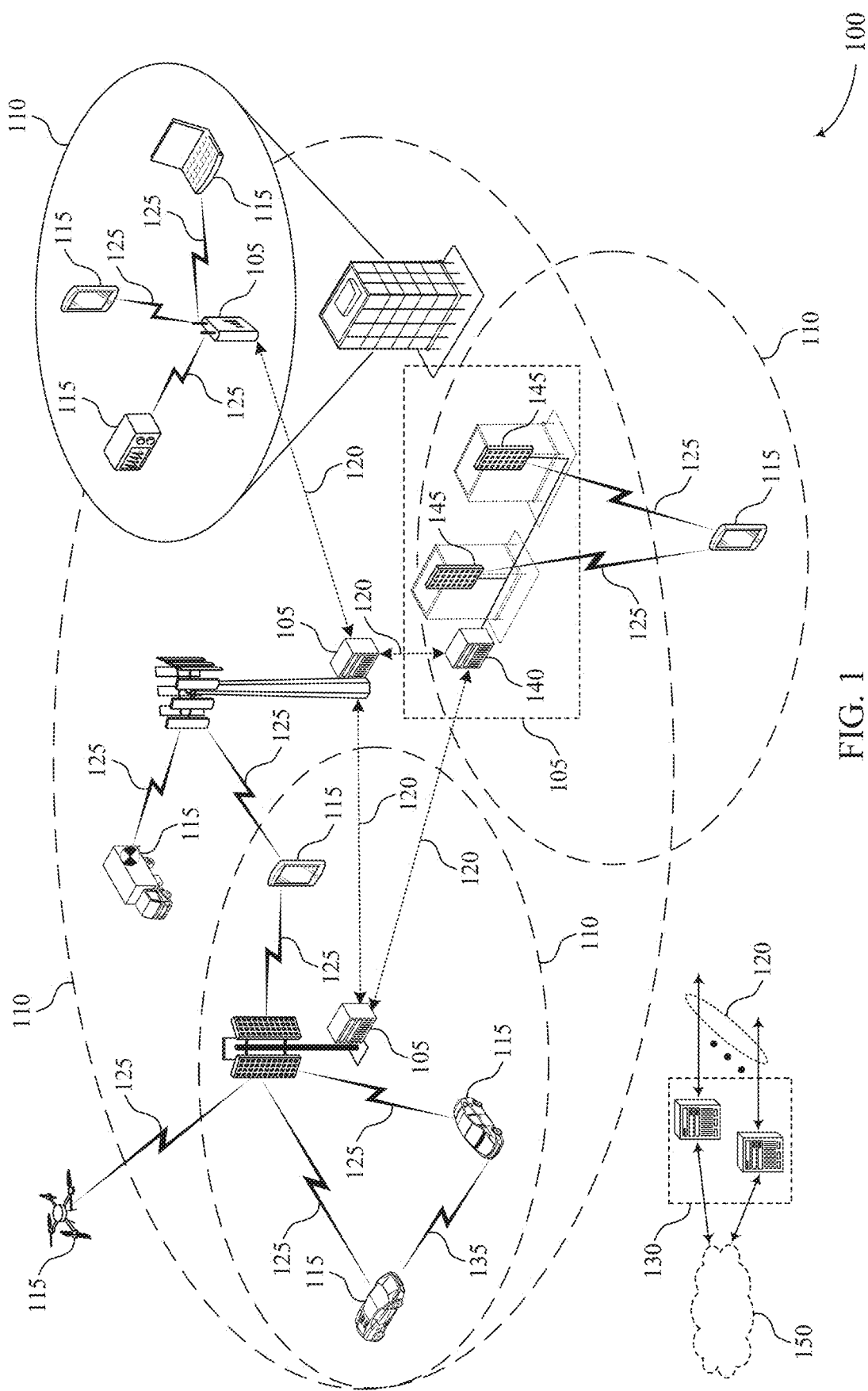
FIG. 1 illustrates an instance of a wireless communications system that supports resource deactivation for interlace resource allocation in accordance with aspects of the present disclosure.

In some cases, a base station may transmit a control message to a user equipment (UE) to indicate the UE to activate or deactivate a periodic resource grant associated with one or more periodic resources, such as semi-persistent scheduling (SPS) resources or configured-grant (CG) resources. To validate whether the control message is for activating or deactivating the periodic resource grant, the UE may check the values of a set of fields of the control message. The set of fields may include a resource assignment field (e.g., resource block assignment field) that indicates a resource block group allocated to the UE. A particular value (e.g., all 1's) may be reserved and not used for resource grants. If the resource assignment field has the value corresponding to performing the deactivation and other associated conditions are met (e.g., other fields in the set of fields also satisfy the criteria for performing deactivation), the UE may deactivate the periodic resource grant.

However, in interlace-based resource allocation, each bit may be associated with a different resource or resource block, and thus the value for performing deactivation (e.g., all 1's) may correspond to a valid set of resources to be activated (e.g., also all 1's). Such a scenario may be due to the resource block assignment field being a bitmap, where each bit of the bitmap is associated with an allocation to a different periodic resource. Having all 1's may indicate that each periodic resource of the bitmap is to be activated. Assuming that the value for activating deactivation is the same as that for activating a set of resources or for scheduling hybrid automatic repeat request (HARQ) transmissions, the UE may be unable to determine whether to perform activation, deactivation, or transmission of HARQ.

To prevent such a scenario from occurring, the network may implement one or more of the techniques described herein. In one aspect, the network may invert the definition of the bitmap such that a 0 indicates that a corresponding periodic resource is to be activated and a 1 indicates that the corresponding periodic resource is not to be activated. As such, all 1's may indicate that no periodic resources are to be activated, which may be an indication compatible with performing deactivation. In another aspect, the network may set the validation condition for deactivation to be all 0's, which may be the value of the resource block assignment field that corresponds to no periodic resources being activated. In yet another aspect, the UE may determine that all 1's does not map to a valid resource configuration (e.g., all 1's indicates to perform deactivation each time).

In some cases, interlace-based allocation may involve the resource block allocation field having fewer bits than the resource block allocation field for other types of allocation (e.g., frequency allocation). Fewer bits may increase the chance that a UE may falsely detect a command to deactivate the resources (e.g., the hamming distance between a valid activation value and the deactivation value may be reduced). As such, when performing interlace-based allocation, the UE may check values of other fields, such as a transmission power control (TPC) field or a time domain resource assignment field to determine if deactivating or activating is to be performed.

In some cases, a UE may concurrently have an activated periodic resource grant for SPS resources and an activated periodic resource grant for CG resources. To enable a control message to indicate whether to deactivate the periodic resource grant for the SPS resources, the periodic resource grant for CG resources, or both, the control message may include a field (e.g., a 2-bit field) that indicates which periodic resource grant(s) to deactivate.

Aspects of the disclosure are initially described in the context of wireless communications systems. Additional aspects of the disclosure are described in the context of an additional wireless communications system, a communications diagram, and a process flow. Aspects of the disclosure are further illustrated by and described with reference to apparatus diagrams, system diagrams, and flowcharts that relate to resource deactivation for interlace resource allocation.

FIG. 1 illustrates an instance of a wireless communications system 100 that supports resource deactivation for interlace resource allocation in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an instance of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For instance, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other aspects, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For instance, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for instance, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for instance, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For instance, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for instance, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For instance, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an instance of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For instance, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For instance, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for instance a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For instance, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For instance, wireless devices such as cellular phones may utilize wireless PAN communications to exchange information such as audio signals with wireless headsets.

In some cases (e.g., when a UE 115 is operating in a NR unlicensed (NR-U) mode), a base station 105 may configure a UE 115 with CG or SPS resources. Each SPS resource may be a periodic resource associated with a set of HARQ identities and may be used for downlink, sidelink, or uplink communications. CG resources, similarly, may be used for downlink, sidelink, or uplink communications. In some cases, a UE 115 may be able to receive physical downlink shared channel (PDSCH) or physical sidelink shared channel (PSSCH) transmissions over the SPS resources without first receiving a corresponding physical downlink control channel (PDCCH) or physical sidelink control channel (PSCCH) message. Periodic resource grants for SPS and CG resources may be activated or deactivated using a control message that includes configured scheduling radio network temporary identifier (CS-RNTI) based downlink control information (DCI). For instance, a periodic resource grant for CG or SPS resources may deactivated after receiving the control message if a cyclic redundancy check (CRC) of a corresponding DCI format is scrambled with a CS-RNTI of the DCI of the control message. Additionally or alternatively, CG or SPS resources may be activated or deactivated after receiving the control message if a new data indicator field of the DCI is set to 0. CG resources, SPS resources, or both may be used in industrial IoT applications.

A UE 115 may determine a DCI format to perform SPS or CG activation to be validated if each of the fields referenced in Table 1 according to the corresponding DCI format for Table 1:

TABLE 1

Fields for SPS and CG activation PDCCH validation

| | DCI format 0_0/ 0_1 | DCI format 1_0 | DCI format 1_1 |
| --- | --- | --- | --- |
| HARQ Process Number | Set to all 0's | Set to all 0's | Set to all 0's |

TABLE 1-continued

Fields for SPS and CG activation PDCCH validation

| | DCI format 0_0/ 0_1 | DCI format 1_0 | DCI format 1_1 |
| --- | --- | --- | --- |
| Redundancy Version | Set to '00' | Set to '00' | For the enabled transport block, set to '00' |

A UE 115 may determine a DCI format to perform SPS or CG deactivation or release to be validated if each of the fields referenced in Table 2 according to the corresponding DCI format for Table 2:

TABLE 2

Fields for SPS and CG release PDCCH validation

| | DCI format 0_0 | DCI format 1_0 |
| --- | --- | --- |
| HARQ Process Number | Set to all 0's | Set to all 0's |
| Redundancy Version | Set to all '00' | Set to all '00' |
| Modulation and Coding Scheme | Set to all 1's | Set to all 1's |
| Resource Block Assignment | Set to all 1's | Set to all 1's |

If the UE 115 achieves validation, the UE 115 may determine that the information in the DCI is a valid activation or release of CG or SPS resources. If validation is not achieved, the UE 115 may determine that the DCI format was detected with a non-matching CRC. The UE 115 may disregard a DCI format with a non-matching CRC or failed validation.

NR-U may support interlace-based frequency resource allocation. For instance, a base station 105 may configure a UE 115 with an interlace made up of a set of frequency resources that are spread over a bandwidth (e.g., a listen-before-talk (LBT) bandwidth within the NR-U bandwidth). The type of interlace resource allocation used and the form of the resource assignment field may depend on a subcarrier spacing (SCS) associated with frequency resources. For instance, if the SCS is 30 kHz, the resource assignment field may have a 5 bit bitmap used to indicate various interlace combinations. Alternatively, if the SCS if 15 kHz, the resource assignment field may have a 10 bit bitmap used to indicate various interlace combinations. In either case, each bit of the bitmap may correspond to a different set of interlaced resource blocks. In other cases, a resource indicator value (RIV) type of assignment may be used for the resource allocation field. RIV type assignments may use values of the resource allocation field (e.g., up to $2^N-1$ values where the resource allocation field has N bits) to refer to specific combinations of resources (e.g., a starting resource and number of resources). An RIV type assignment may include combinations of start length indicator values (SLIVs) or RIV values indicating specific combinations. According to some aspects, if the SCS is 15 kHz, the resource block assignment field may use 6 bits to indicate a start interlace index and a number of contiguous interlace indices and may use up to 9 remaining RIV values to indicate pre-defined interlace combinations.

A UE 115 may receive a first control message from a base station 105 associated with a periodic resource grant, where the first control message includes a resource allocation field and where a first value of the resource allocation field allocates a first one or more periodic resources of a set of periodic resources. The UE 115 may transmit or receive signaling with the base station 105 over the one or more periodic resources. The UE 115 may receive a second control message from the base station 105 that includes the resource allocation field and at least one other field after transmitting or receiving the signaling, where the resource allocation field of the second control message includes a second value. The UE 115 may deactivate the periodic resource grant based on the second value of the resource allocation field and a third value of the at least one other field.

Figure 2:
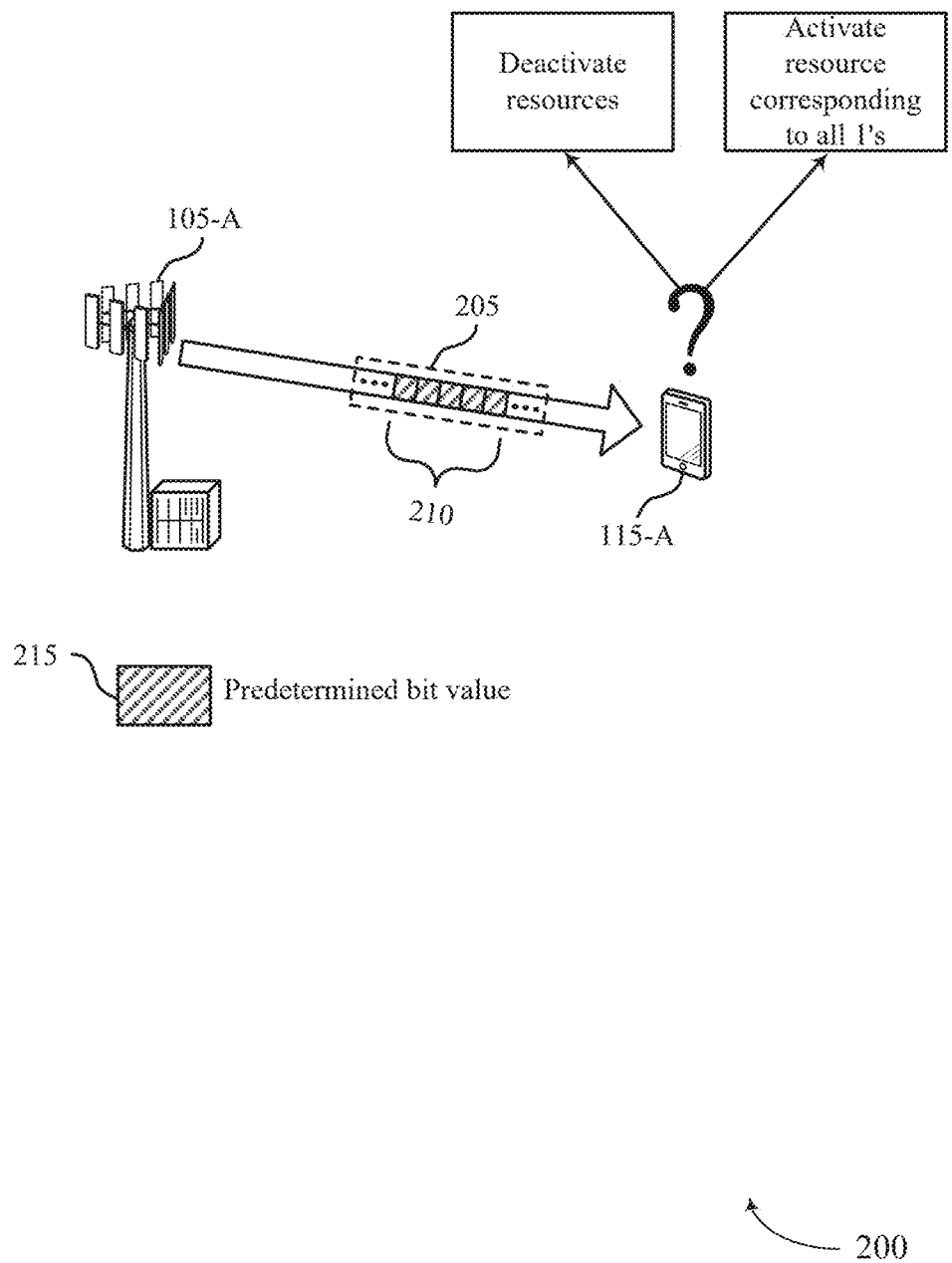
FIG. 2 illustrates an instance of a wireless communications system that supports resource deactivation for interlace resource allocation in accordance with aspects of the present disclosure.

FIG. 2 illustrates an instance of a wireless communications system 200 that supports resource deactivation for interlace resource allocation in accordance with aspects of the present disclosure. In some aspects, wireless communications system 200 may implement aspects of wireless communications system 100. For instance, base station 105-*a* and UE 115-*a* may be examples of a base station 105 and a UE 115, respectively, as described with reference to FIG. 1.

In some cases, base station 105-*a* may transmit a control message 205 to UE 115-*a*. A control message 205 may indicate to activate or deactivate one or more periodic resources, as described with reference to FIG. 1. The control message 205 may be transmitted via a PDCCH and may include DCI. The DCI may contain one or more fields, including a resource assignment field 210, which may also be referred to as a resource allocation field, as described with reference to FIG. 1. The resource allocation field may correspond to a frequency domain resource assignment (FDRA).

If the resource assignment field 210 includes all bits set to a predetermined bit value 215 (e.g., a bit value of '1'), such as described with reference to Table 2 of FIG. 1, UE 115-*a* may deactivate a periodic resource grant associated with one or more periodic resources. However, in the case that the resource assignment field is being used for interlace-based resource allocation using a bitmap where each bit corresponds to an interlace, each bit set to the predetermined bit value 215 may point to a valid resource allocation. As such, UE 115-*a* may be unable to determine whether to deactivate a periodic resource grant or to activate a periodic resource grant associated with the resource assignment field 210 having each resource allocated.

To prevent such a scenario from occurring, the network may implement one or more of the techniques described herein. In one aspect, the network may invert the definition of the bitmap such that a bit value of '0' indicates that a corresponding periodic resource is to be activated and a bit value of '1' indicates that the corresponding periodic resource is not to be activated. As such, all bits of the resource allocation field set to a bit value of '1' may indicate that no periodic resources are to be activated. In some such aspects, the network may invert the definition for a bitmap corresponding to one SCS (e.g., one of 15 kHz or 30 kHz) but may not do so for another bitmap corresponding to another SCS (e.g., the other of 15 kHz or 30 kHz). Instead, a value of all '1' for the resource allocation bit field for the other SCS may still be used to indicate deactivation. In another aspect, the network may set the validation condition for deactivation to be all 0's, which may be the value of the resource block assignment field that corresponds to no periodic resources being activated. In yet another aspect, UE 115-*a* may determine that all bits of the resource allocation field having a bit value of '1' does not map to a valid resource configuration. As such, when UE 115-*a* receives all '1's in the resource allocation field, UE 115-*a* may perform deactivation.

In some cases, interlace-based allocation may involve the resource block allocation field having fewer bits than the resource block allocation field for other types of allocation (e.g., frequency allocation). Fewer bits may increase the chance that a UE 115-*a* may falsely detect a command to deactivate the resources. As such, when performing interlace-based allocation, UE 115-*a* may check values of other fields (e.g., in addition to those in Table 2), such as a transmission power control (TPC) field or a time domain resource assignment field to determine if deactivating or activating is to be performed. UE 115-*a* may refrain from checking such fields when non-interlace-based allocation (e.g., frequency resource allocation) is being performed or may check such fields regardless of what type of resource allocation is being performed. In the latter case, UE 115-*a* may check such fields as long as the cell serving UE 115-*a* is an NR-U cell. It should be noted that such methods may be performed for when the activated periodic resource grant is for CG resources (e.g., uplink or sidelink CG resources), the activated periodic resource grant is for SPS resources (e.g., downlink or sidelink SPS resources), or when there are activated periodic resource grants for both.

In some cases, UE 115-*a* may concurrently have an activated periodic resource grant for SPS resources and an activated periodic resource grant for CG resources. Both periodic resource grants may be activated by a single control message 205 or may be activated by separate control messages 205. In some cases, the CG and SPS resources whose periodic resource grants are activated by a single control message 205 may be within a same bandwidth part. One technique for selectively deactivating the periodic resource grant for the SPS resources or the activated periodic resource grant for the CG resources is to transmit separate control messages 205 (e.g., separate DCIs) for deactivation. However, such methods may incur extra overhead.

Instead, to enable a control message to indicate whether to deactivate the periodic resource grant for the SPS resources, the periodic resource grant for CG resources, or both without incurring the extra overhead, the control message 205 may include a field (e.g., a 2-bit field) that indicates which periodic resource grant(s) to deactivate or release. Releasing or deactivating both a periodic resource grant for CG resources and one for SPS resources may be referred to as joint deactivation or joint release. Even though a control message 205 used for activation may include a resource assignment that is different for CG and SPS and may thus involve using different DCIs for activation of CG versus SPS, a deactivation command may not include any relevant scheduling information and may have overlap in contents for deactivation of both CG and SPS resource grants. As such, UE 115-*a* may be able to use a single control message 205 to deactivate periodic resource grants for either or both of CG resources and SPS resources. In some cases, the CG and SPS resources whose periodic resource grants are deactivated by a single control message 205 may be within a same bandwidth part. An instance of performing deactivation may be described with reference to FIG. 3.

In cases where the CG resources are uplink resources and the SPS resources are downlink resources, or vice-versa, the control message 205 may include the indication for deactivation or release in either downlink DCI (e.g., DCI format 0_0) or uplink DCI (e.g., DCI format 1_0). It should be noted that the methods described herein may apply to downlink DCI and uplink DCI as long as the control message 205 used for activation contains a DCI with a resource block assignment field that includes a bitmap type resource allocation field for resource allocation.

The methods as described herein may also apply to situations where a control message 205 is used to activate SPS or CG resources for sidelink communications (e.g., communications between UEs 115) on an unlicensed channel. Such methods may be applicable if bitmap based interlace allocation is supported for transmissions between UEs 115. For instance, base station 105-a may transmit a control message 205 to UE 115-a that activates a periodic resource grant for sidelink SPS and/or CG resources. Similarly, base station 105-a may transmit a control message 205 to UE 115-a that deactivates periodic resource grant(s) for sidelink SPS and/or CG resources. Alternatively, the UE 115 communicating with UE 115-a according to the sidelink SPS and/or CG resources may transmit a DCI or sidelink control information (SCI) to UE 115-a to indicate to deactivate periodic resource grant(s) for sidelink SPS and/or CG resources.

Redefining the bitmap or the validation condition, or determining that all bits having a bit value of '1' is an invalid resource configuration may prevent confusion at the side of UE 115-a and may enable UE 115-a to perform commands from base station 105-a more accurately. Meanwhile, using additional fields to validate whether or not a control message 205 is for deactivating a periodic resource grant may enable UE 115-a to experience fewer false detections and to be less likely to errantly deactivate a periodic resource grant that base station 105-a did not request to be deactivated. Meanwhile, deactivating both SPS and CG periodic resource grants with a single control message 205 may limit the overhead associated with transmitting two separate control messages 205 to deactivate each periodic resource grant.

Figure 3:
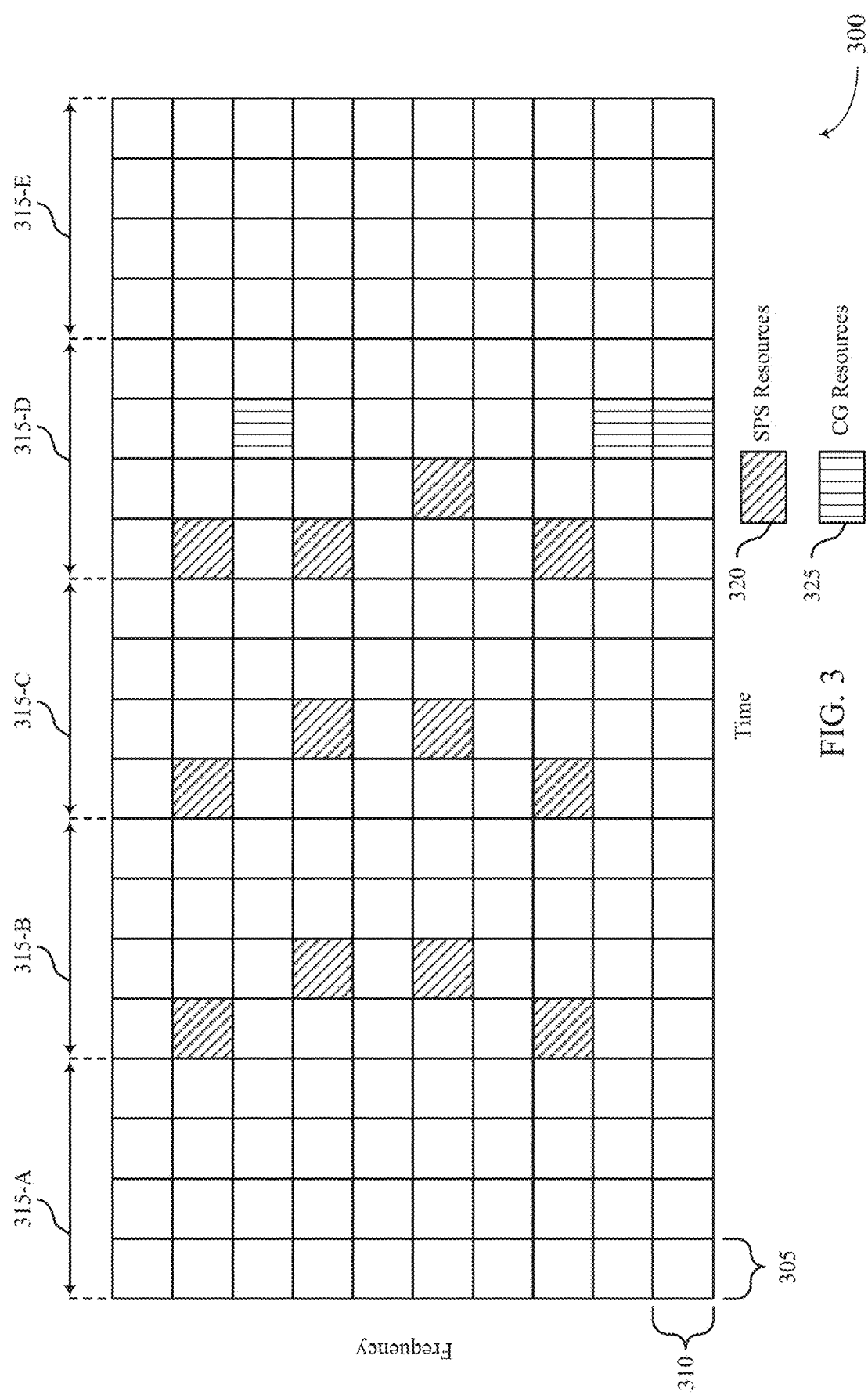
FIG. 3 illustrates an instance of a communications diagram that supports resource deactivation for interlace resource allocation in accordance with aspects of the present disclosure.

FIG. 3 illustrates an instance of a communications diagram 300 that supports resource deactivation for interlace resource allocation in accordance with aspects of the present disclosure. In some aspects, communications diagram 300 may be implemented by aspects of wireless communications system 100. Communications diagram 300 may demonstrate an instance of a control message deactivating one or more periodic resource grants.

Communications diagram 300 may include resource blocks 310 defined by frequency resources (e.g., groups of subcarriers, sub-bands, sub-channels) and time spans 305 (e.g., subframes, symbols, slots). Additionally, the communications diagram 300 may be divided into periods 315 in which periodic resources (e.g., CG resources 325 and/or SPS resources 320) may repeat. It should be noted that there may be instances where a period 315 for SPS resources 320 may differ from a period for CG resources 325.

During period 315-a, no periodic resource grants may be activated at a UE 115. At some point in period 315-a, a base station 105 may transmit a control message to the UE 115 that activates a periodic resource grant for SPS resources 320, where the mechanism for activation may be as described with reference to FIG. 2. Accordingly, over periods 315-b and 315-c, the base station 105 and the UE 115 may communicate over the SPS resources 320. For instance, the base station 105 may transmit a PDSCH transmission to the UE 115 or the UE 115 may receive a PSSCH transmissions from another UE 115 over the SPS resources 320.

During period 315-c, the base station 105 may transmit a control message for the UE 115 that activates a periodic resource grant for CG resources 325, where the mechanism for activation may be as described with reference to FIG. 2. Accordingly, over period 315-d, the base station and the UE 115 may communicate over the SPS resources 320 and the CG resources 325. For instance, the base station 105 may transmit a PDSCH transmission to the UE 115 over the SPS resources 320 and the UE 115 may transmit a PUSCH transmission to the base station 105 or a PSSCH transmission to another UE 115 over the CG resources 325.

During period 315-d, the base station 105 may transmit a control message for the UE 115 that deactivates both the periodic resource grant for the SPS resources 320 and the CG resources 325. For instance, the base station 105 may transmit a control message with a field that indicates to deactivate both periodic resource grants. As such, during period 315-e, the UE 115 and the base station 105 may not communicate over the SPS resources 320 or the CG resources 325.

Figure 4:
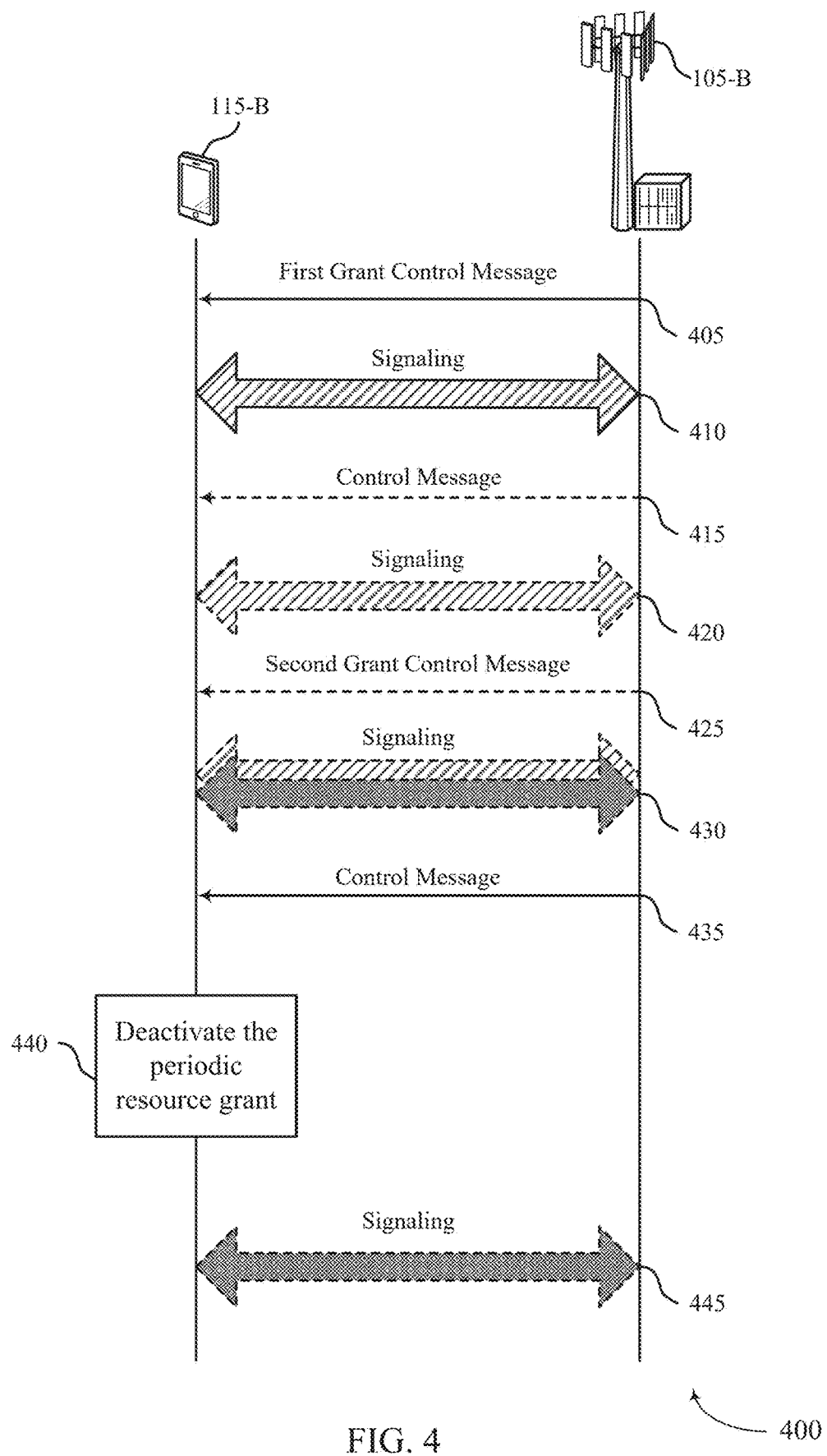
FIG. 4 illustrates an instance of a process flow that supports resource deactivation for interlace resource allocation in accordance with aspects of the present disclosure.

FIG. 4 illustrates an instance of a process flow 400 that supports resource deactivation for interlace resource allocation in accordance with aspects of the present disclosure. In some aspects, process flow 400 may be implemented by aspects of wireless communications systems 100. For instance, base station 105-b and UE 115-b may be instances of a base station 105 and a UE 115, respectively, as described with reference to FIG. 1.

At 405, base station 105-b may transmit a control message (e.g., a DCI) that indicates to activate a first periodic resource grant and UE 115-b may receive the first control message. The first control message may include a resource allocation field, where each bit of the resource allocation field is associated with allocation of a periodic resource of a set of periodic resources. In some cases, a first value of the resource allocation field for the first control message may allocate a first one or more periodic resources of the set of periodic resources. The first one or more periodic resources may be SPS resources or CG resources.

At 410, UE 115-b may transmit or receive signaling over the first one or more periodic resources. Base station 105-b may receive or transmit the signaling, respectively.

At 415, base station 105-b may transmit a control message (e.g., a DCI) including the resource allocation field and at least one other field. The resource allocation field of the control message may have an associated value and the at least one other field of the control message may have an associated value. The associated value of the resource allocation field of the control message may be at a value that indicates to deactivate the first one or more periodic resources. For instance, the associated value may correspond to a deallocated condition for the respective resource of the set of periodic resources, such as all 1's according to one implementation as described with reference to FIG. 2 or all 0's according another implementation as described with reference to FIG. 2. However, the associated value of the at least one other field of the control message may have a value that fails to indicate to deactivate the first periodic resource grant. As such UE 115-b may not deactivate the first periodic resource grant. Additionally, assuming that the associated value corresponds to a deallocated condition for the respective resource of the set of periodic resources, the resource allocation field may thus point to no resources to activate. As such, UE 115-b may not activate new resources. In some cases, the at least one other field may be a HARQ number field, a redundancy version field, a new data indicator field, a TPC field, a time domain assignment field, or a combination thereof.

At 420, UE 115-b may transmit or receive additional signaling over the first one or more periodic resources. Base station 105-b may receive or transmit the additional signaling, respectively.

At 425, base station 105-*b* may transmit a control message (e.g., a DCI) associated with a second periodic resource grant. The control message may include an associated value for the resource allocation field that allocates a second one or more periodic resources of a second set of periodic resources. Activating the second periodic resource grant may not deactivate the first periodic resource grant if one of the first one or more periodic resources and the second one or more periodic resources are SPS resources and the other of the first one or more periodic resources and the second one or more periodic resources are CG resources. A control message that includes uplink DCI may configure uplink or sidelink CG resources and a control message that includes downlink DCI may configure downlink or sidelink SPS resources.

At 430, UE 115-*b* may transmit or receive additional signaling over the first one or more resources and/or the second one or more resources. UE 115-*b* may transmit or receive over the first one or more resources and the second one or more resources if the first one or more resources are downlink SPS resources and the second one or more resources are uplink CG resources or vice-versa.

At 435, base station 105-*b* may transmit a control message (e.g., a DCI) that includes the resource allocation field and at least one other field and UE 115-*b* may receive the control message. The resource allocation field of the control message may have an associated value and the at least one other field of the control message may have an associated value. The associated value of the resource allocation field of the control message may be at a value that indicates to deactivate the first one or more periodic resources. For instance, the associated value may correspond to a deallocated condition for the respective resource of the set of periodic resources, such as all 1's according to one implementation as described with reference to FIG. 2 or all 0's according to another implementation as described with reference to FIG. 2. Likewise, the associated value of the at least one other field of the control message may have a value that indicates to deactivate the first periodic resource grant.

At 440, UE 115-*b* may deactivate the first periodic resource grant based on the value of the resource allocation field and the value of the at least one other field of the control message indicating to deactivate the first periodic resource grant. In cases where UE 115-*b* has activated the second periodic grant, UE 115-*b* may also deactivate the second periodic grant based on the value of the resource allocation field and the value of the at least one other field of the control message of 435 indicating to deactivate the first periodic resource grant. Alternatively, the control message of 435 may include a field indicating whether to deactivate the first periodic resource grant, the second periodic resource grant, or both. In such cases, UE 115-*b* may deactivate the periodic resource grant(s) indicated by the field. In some cases, deactivating the first periodic resource grant may be based on the control message of 435 including a CS-RNTI scrambled with a CRC.

In some cases, deactivating the first periodic resource grant may be based on a type of resource allocation associated with the resource allocation field. For instance, if the type of resource allocation is not a bitmap-based or interlace-based allocation and each of the at least one other field indicates to perform the deactivating except for a TPC field or time domain assignment field, UE 115-*b* may still perform the deactivating. However, if the type of resource allocation is bitmap-based or interlace-based and the TPC field or time domain field does not indicate to perform the deactivating, UE 115-*b* may refrain from performing the deactivating. In other cases, UE 115-*b* may refrain from performing the deactivating if the TPC field or time domain field fails to indicate to perform the deactivating regardless of the type of resource allocation.

Assuming that UE 115-*b* deactivates the first periodic resource grant, but not the second (e.g., due to the field indicating to deactivate the first periodic resource grant), UE 115-*b* may transmit or receive signaling at 445 over the second one or more periodic resources. Base station 105-*b* may receive or transmit the signaling, respectively.

Figure 5:
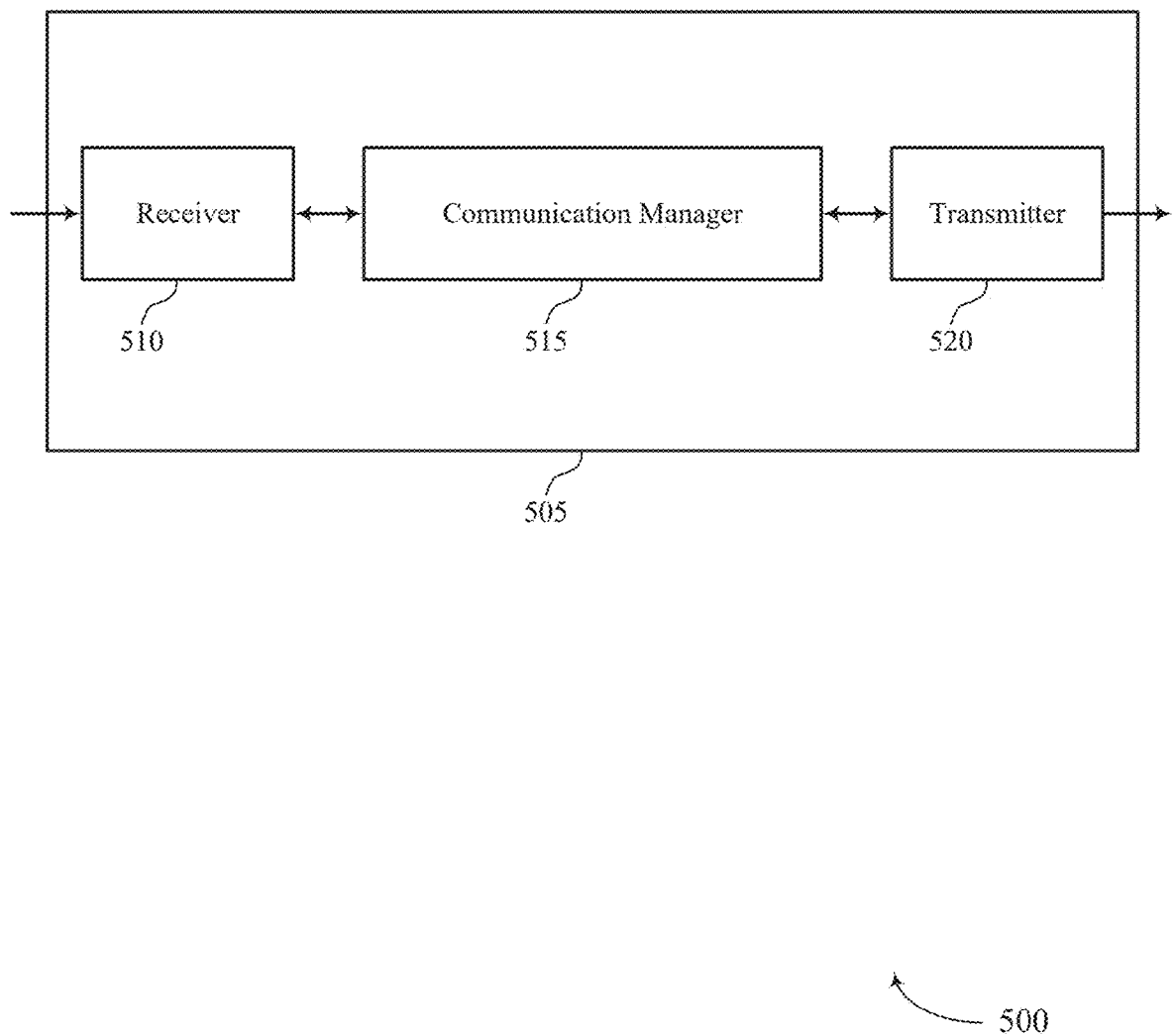
FIGS. 5 and 6 show block diagrams of devices that support resource deactivation for interlace resource allocation in accordance with aspects of the present disclosure.

FIG. 5 shows a block diagram 500 of a device 505 that supports resource deactivation for interlace resource allocation in accordance with aspects of the present disclosure. The device 505 may be an instance of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource deactivation for interlace resource allocation, etc.). Information may be passed on to other components of the device 505. The receiver 510 may be an instance of aspects of the transceiver 815 described with reference to FIG. 8. The receiver 510 may utilize a single antenna or a set of antennas.

The communication manager 515 may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources, receive a second control message that includes the resource allocation field and at least one other field after transmitting or receiving the signaling over the first one or more periodic resources, where the resource allocation field of the second control message includes a second value, transmit or receiving signaling over the first one or more periodic resources, and deactivate the periodic resource grant based on the second value of the resource allocation field and a third value of the at least one other field.

Additionally or alternatively, the communication manager 515 may receive a first control message allocating a first periodic resource grant and comprising a first resource allocation field associated with a first subcarrier spacing, wherein each bit of the first resource allocation field is associated with allocation of a periodic resource of a first plurality of periodic resources; receive a second control message that comprises the first resource allocation field, wherein the first resource allocation field of the second control message comprises a first value; deactivate the first periodic resource grant based at least in part on the first value of the first resource allocation field and the first subcarrier spacing; receive a third control message allocating a second periodic resource grant and comprising a second resource allocation field associated with a second subcarrier spacing, wherein each bit of the second resource allocation field is associated with allocation of a periodic resource of a second plurality of periodic resources; receive a fourth control message that comprises the second resource allocation field, wherein the second resource allocation field of the fourth control message comprises a second value different from the first value of the first resource allocation field; and deactivate the second periodic resource grant based at least in part on the second value of the second resource allocation field and the second subcarrier spacing. The communication manager 515 may be an instance of aspects of the communication manager 810 described herein.

The communication manager 515 using a redefined bitmap or validation condition based on subcarrier spacing may prevent confusion at the side of communication manager 515 and may enable communication manager 515 to perform commands from a base station more accurately. For instance, by using a redefined bitmap, the communication manager 515 may prevent a scenario in which the bitmap indicates to activate resources and to deactivate resources.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some aspects, the communication manager 515, or its sub-components, may be a separate and distinct component in accordance with various aspects of the present disclosure. In some aspects, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some aspects, the transmitter 520 may be collocated with a receiver 510 in a transceiver module. For instance, the transmitter 520 may be an instance of aspects of the transceiver 815 described with reference to FIG. 8. The transmitter 520 may utilize a single antenna or a set of antennas.

Figure 6:
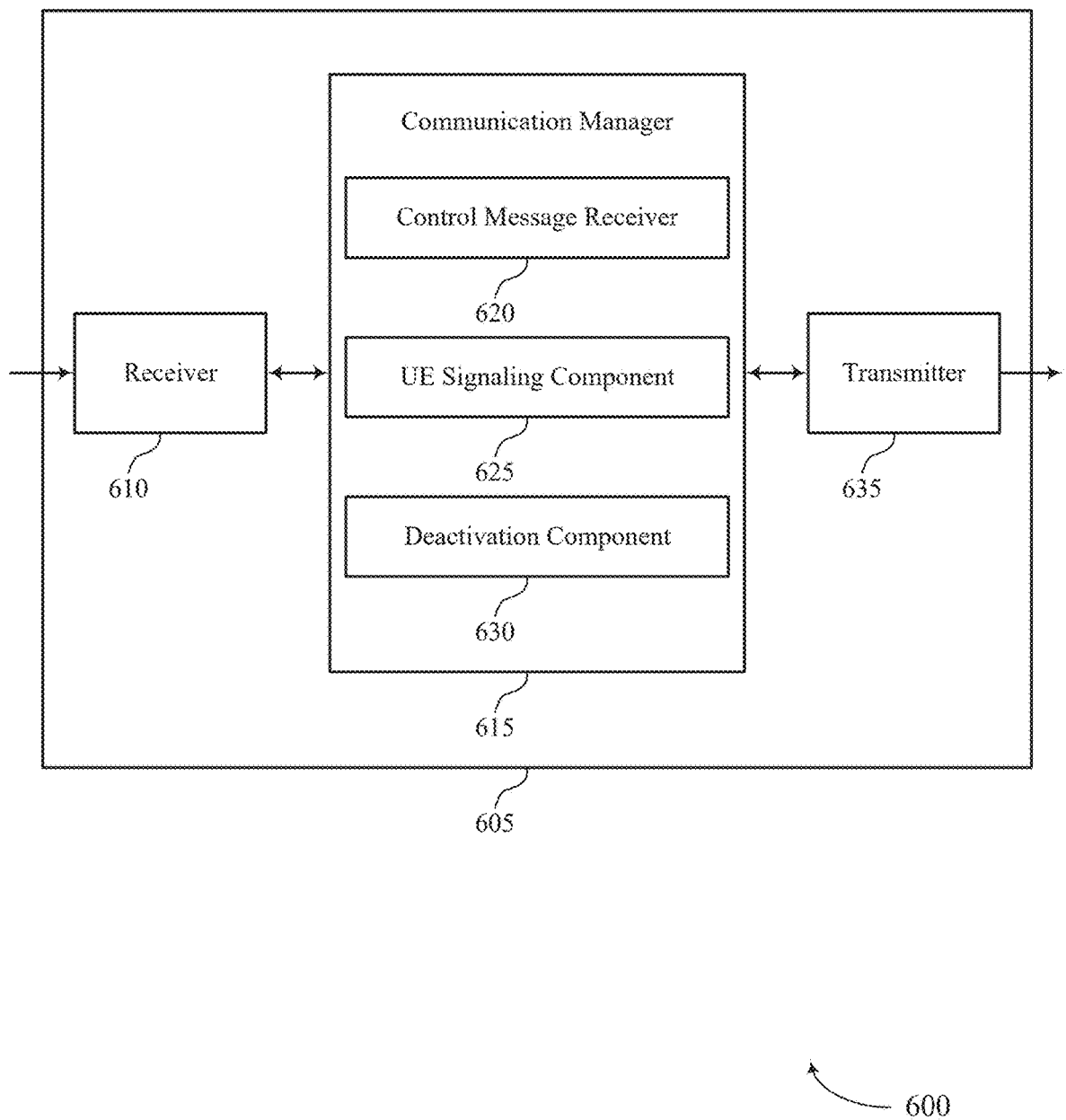

FIG. 6 shows a block diagram 600 of a device 605 that supports resource deactivation for interlace resource allocation in accordance with aspects of the present disclosure. The device 605 may be an instance of aspects of a device 505, or a UE 115 as described herein. The device 605 may include a receiver 610, a communication manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to resource deactivation for interlace resource allocation, etc.). Information may be passed on to other components of the device 605. The receiver 610 may be an instance of aspects of the transceiver 815 described with reference to FIG. 8. The receiver 610 may utilize a single antenna or a set of antennas.

The communication manager 615 may be an instance of aspects of the communication manager 515 as described herein. The communication manager 615 may include a control message receiver 620, an UE signaling component 625, and a deactivation component 630. The communication manager 615 may be an instance of aspects of the communication manager 810 described herein.

The control message receiver 620 may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources and receive a second control message that includes the resource allocation field and at least one other field after transmitting or receiving the signaling over the first one or more periodic resources, where the resource allocation field of the second control message includes a second value.

The UE signaling component 625 may transmit or receiving signaling over the first one or more periodic resources.

The deactivation component 630 may deactivate the periodic resource grant based on the second value of the resource allocation field and a third value of the at least one other field.

The transmitter 635 may transmit signals generated by other components of the device 605. In some aspects, the transmitter 635 may be collocated with a receiver 610 in a transceiver module. For instance, the transmitter 635 may be an instance of aspects of the transceiver 815 described with reference to FIG. 8. The transmitter 635 may utilize a single antenna or a set of antennas.

Figure 7:
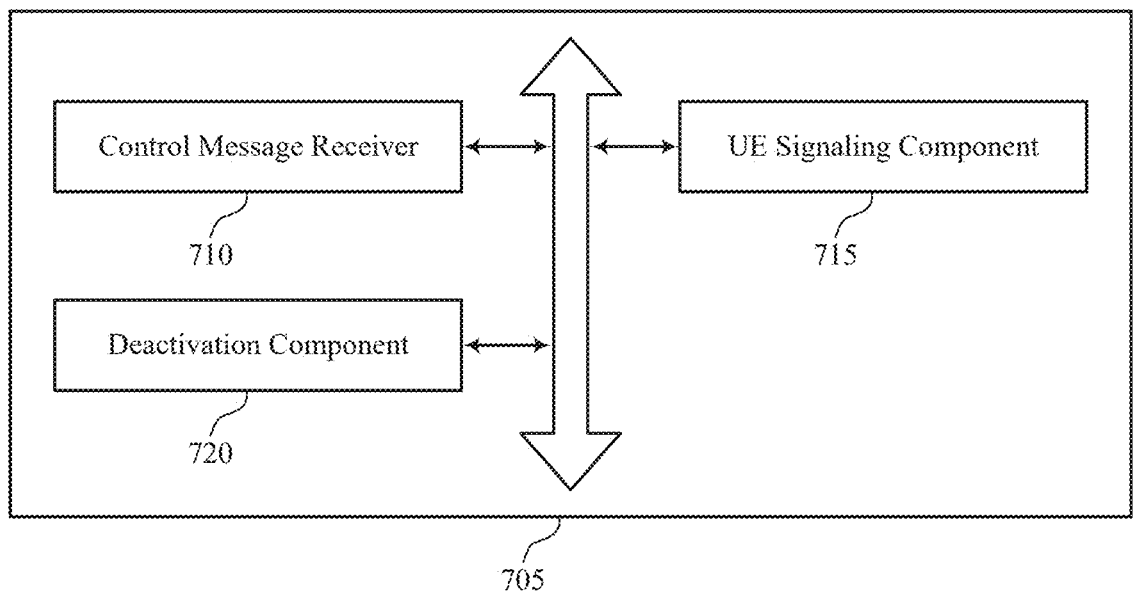
FIG. 7 shows a block diagram of a communication manager that supports resource deactivation for interlace resource allocation in accordance with aspects of the present disclosure.

FIG. 7 shows a block diagram 700 of a communication manager 705 that supports resource deactivation for interlace resource allocation in accordance with aspects of the present disclosure. The communication manager 705 may be an instance of aspects of a communication manager 515, a communication manager 615, or a communication manager 810 described herein. The communication manager 705 may include a control message receiver 710, an UE signaling component 715, and a deactivation component 720. Each of these modules may communicate, directly or indirectly, with one another (e.g., via one or more buses).

The control message receiver 710 may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. In some aspects, the control message receiver 710 may receive a second control message that includes the resource allocation field and at least one other field after transmitting or receiving the signaling over the first one or more periodic resources, where the resource allocation field of the second control message includes a second value.

In some aspects, the control message receiver 710 may receive a third control message associated with a second periodic resource grant, the third control message including a fourth value for the resource allocation field that allocates a second one or more periodic resources of a second set of periodic resources. In some aspects, control message receiver 710 may receive a third control message including the resource allocation field and the at least one other field, where the resource allocation field of the third control message includes a fourth value and the at least one other field of the third control message includes a fifth value, and where the fourth value of the resource allocation field of the third control message is the same as the second value of the resource allocation field of the second control message, and the fifth value of the at least one other field of the third control message is different from the third value of the at least one other field of the second control message.

The UE signaling component 715 may transmit or receiving signaling over the first one or more periodic resources. In some aspects, the UE signaling component 715 may transmit or receiving additional signaling over the second one or more periodic resources In some aspects, the UE signaling component 715 may transmit or receiving additional signaling over the first one or more periodic resources after receiving the third control message and before receiving the second control message based on the fifth value of the at least one other field of the third control message being different from the third value of the at least one other field of the second control message.

The deactivation component 720 may deactivate the periodic resource grant based on the second value of the resource allocation field and a third value of the at least one other field. In some aspects, the deactivation component 720 may identify a field of the second control message indicating whether to deactivate the periodic resource grant, the second periodic resource grant, or both, where deactivating the periodic resource grant is based on the field. In some cases, the deactivating the periodic resource grant is based on each bit of the second value of the resource allocation field of the second control message corresponding to a deallocated condition for the respective periodic resource of the plurality of periodic resources. In some cases, the deactivating the periodic resource grant is based on each bit of the second value of the resource allocation field of the second control message corresponding to an allocated condition for the respective periodic resource of the plurality of periodic resources. In some cases, the deactivating the periodic resource grant is based on a type of resource allocation associated with the resource allocation field. In some cases, the deactivating the periodic resource grant is based on the second control message including a configured scheduling radio network temporary identifier scrambled with a cyclic redundancy check.

Figure 8:
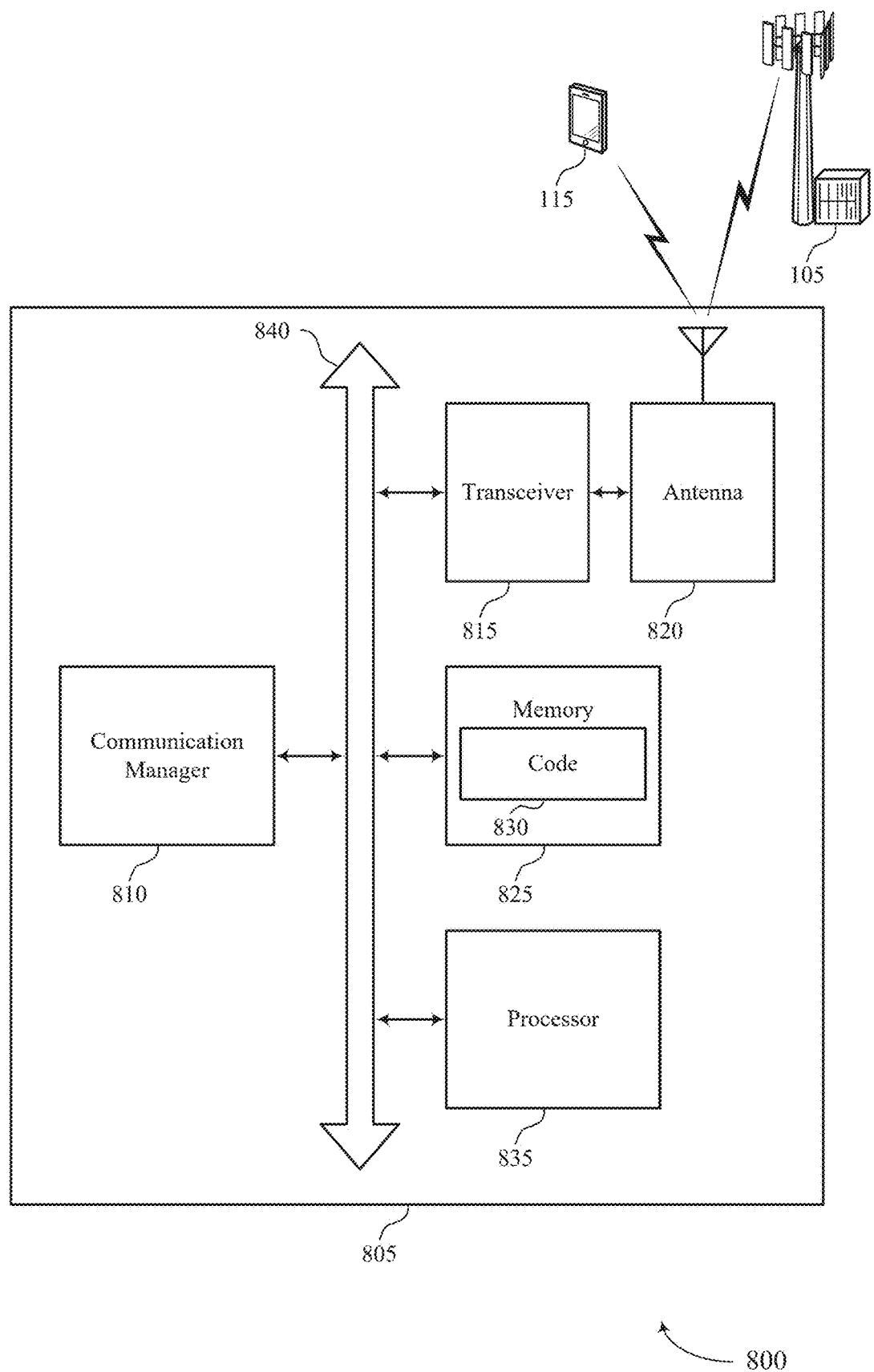
FIG. 8 shows a diagram of a system including a device that supports resource deactivation for interlace resource allocation in accordance with aspects of the present disclosure.

FIG. 8 shows a diagram of a system 800 including a device 805 that supports resource deactivation for interlace resource allocation in accordance with aspects of the present disclosure. The device 805 may be an instance of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources, receive a second control message that includes the resource allocation field and at least one other field after transmitting or receiving the signaling over the first one or more periodic resources, where the resource allocation field of the second control message includes a second value, transmit or receiving signaling over the first one or more periodic resources, and deactivate the periodic resource grant based on the second value of the resource allocation field and a third value of the at least one other field.

Additionally or alternatively, the communication manager 810 may receive a first control message allocating a first periodic resource grant and comprising a first resource allocation field associated with a first subcarrier spacing, wherein each bit of the first resource allocation field is associated with allocation of a periodic resource of a first plurality of periodic resources; receive a second control message that comprises the first resource allocation field, wherein the first resource allocation field of the second control message comprises a first value; deactivate the first periodic resource grant based at least in part on the first value of the first resource allocation field and the first subcarrier spacing; receive a third control message allocating a second periodic resource grant and comprising a second resource allocation field associated with a second subcarrier spacing, wherein each bit of the second resource allocation field is associated with allocation of a periodic resource of a second plurality of periodic resources; receive a fourth control message that comprises the second resource allocation field, wherein the second resource allocation field of the fourth control message comprises a second value different from the first value of the first resource allocation field; and deactivate the second periodic resource grant based at least in part on the second value of the second resource allocation field and the second subcarrier spacing.

The transceiver 815 may communicate bi-directionally, via one or more antennas, wired, or wireless links as described above. For instance, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting resource deactivation for interlace resource allocation).

Figure 9:
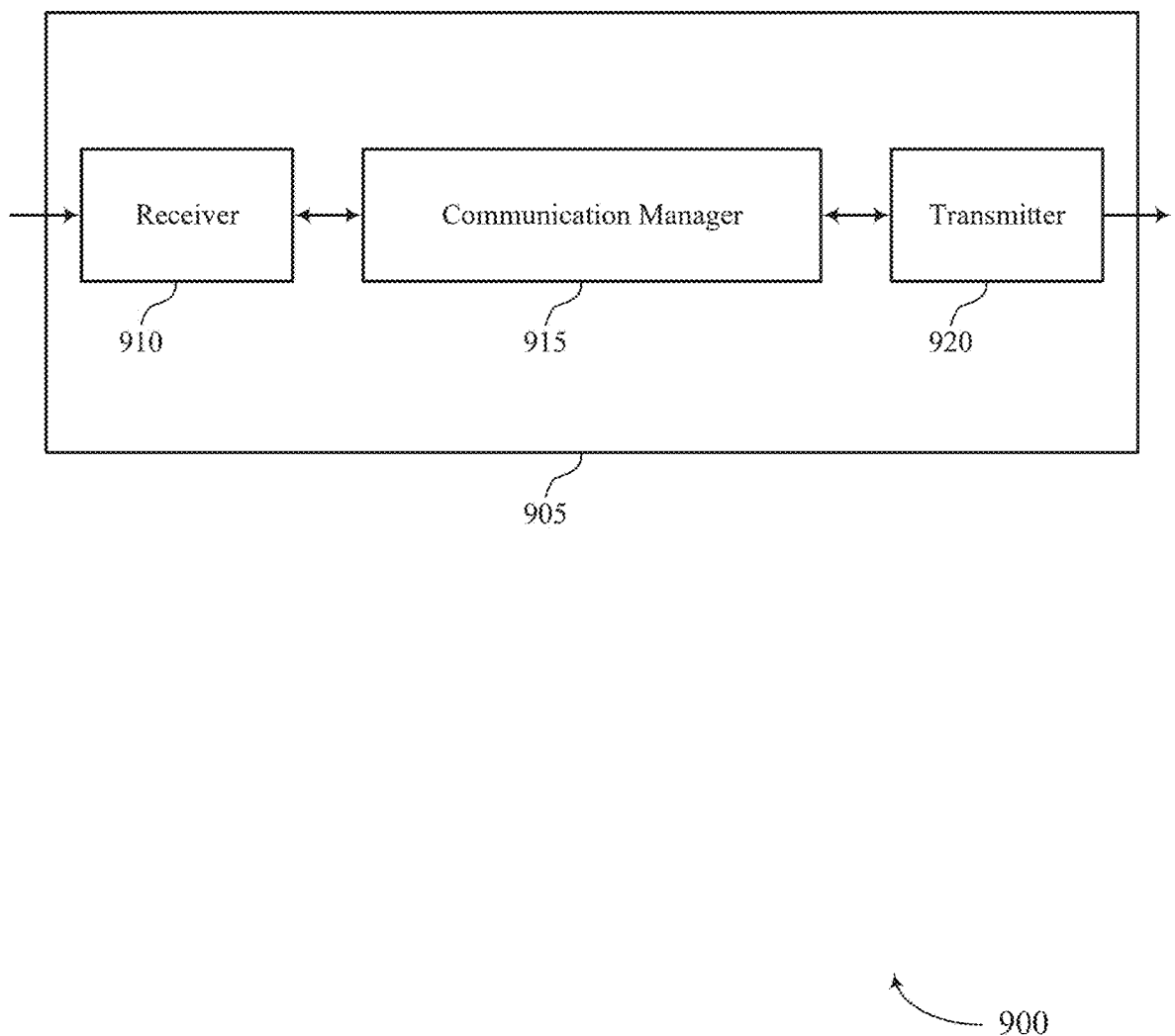
FIGS. 9 and 10 show block diagrams of devices that support resource deactivation for interlace resource allocation in accordance with aspects of the present disclosure.

FIG. 9 shows a block diagram 900 of a device 905 that supports resource deactivation for interlace resource allocation in accordance with aspects of the present disclosure. The device 905 may be an instance of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource deactivation for interlace resource allocation, etc.). Information may be passed on to other components of the device 905. The receiver 910 may be an instance of aspects of the transceiver 1220 described with reference to FIG. 12. The receiver 910 may utilize a single antenna or a set of antennas.

The communication manager 915 may transmit, to a UE, a first control message that indicates to activate a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources, transmit, to the UE, a second control message that includes the resource allocation field and at least one other field after transmitting or receiving the signaling over the first one or more periodic resources, where the resource allocation field of the second control message includes a second value, and where the second control message indicates to deactivate the periodic resource grant based on the second value of the resource allocation field and a third value of the at least one other field, and receive or transmitting signaling with the UE over the first one or more periodic resources. The communication manager 915 may be an instance of aspects of the communication manager 1210 described herein.

Additionally or alternatively, the communication manager 915 may transmit, to a UE, a first control message that indicates to activate a first periodic resource grant, the first control message comprising a first resource allocation field associated with a first subcarrier spacing, wherein each bit of the first resource allocation field is associated with allocation of a periodic resource of a first plurality of periodic resources; transmit, to the UE, a second control message that comprises the first resource allocation field, wherein the first resource allocation field of the second control message comprises a first value, and wherein the second control message indicates to deactivate the first periodic resource grant based at least in part on the first value of the first resource allocation field and the first subcarrier spacing; transmit, to the UE, a third control message that indicates to activate a second periodic resource grant, the third control message comprising a second resource allocation field associated with a second subcarrier spacing, wherein each bit of the second resource allocation field is associated with allocation of a periodic resource of a second plurality of periodic resources; and transmit, to the UE, a fourth control message that comprises the second resource allocation field, wherein the second resource allocation field of the second control message comprises a second value different from the first value of the first resource allocation field, and wherein the fourth control message indicates to deactivate the second periodic resource grant based at least in part on the second value of the second resource allocation field and the second subcarrier spacing.

The communication manager 915 using a redefined bitmap or validation condition based on subcarrier spacing may prevent confusion at the side of communication manager 515 and may enable communication manager 915 to send commands that a UE may perform more accurately. For instance, by using a redefined bitmap, the communication manager 915 may prevent a scenario in which the bitmap indicates to activate resources and to deactivate resources.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some aspects, the communication manager 915, or its sub-components, may be a separate and distinct component in accordance with various aspects of the present disclosure. In some aspects, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some aspects, the transmitter 920 may be collocated with a receiver 910 in a transceiver module. For instance, the transmitter 920 may be an instance of aspects of the transceiver 1220 described with reference to FIG. 12. The transmitter 920 may utilize a single antenna or a set of antennas.

Figure 10:
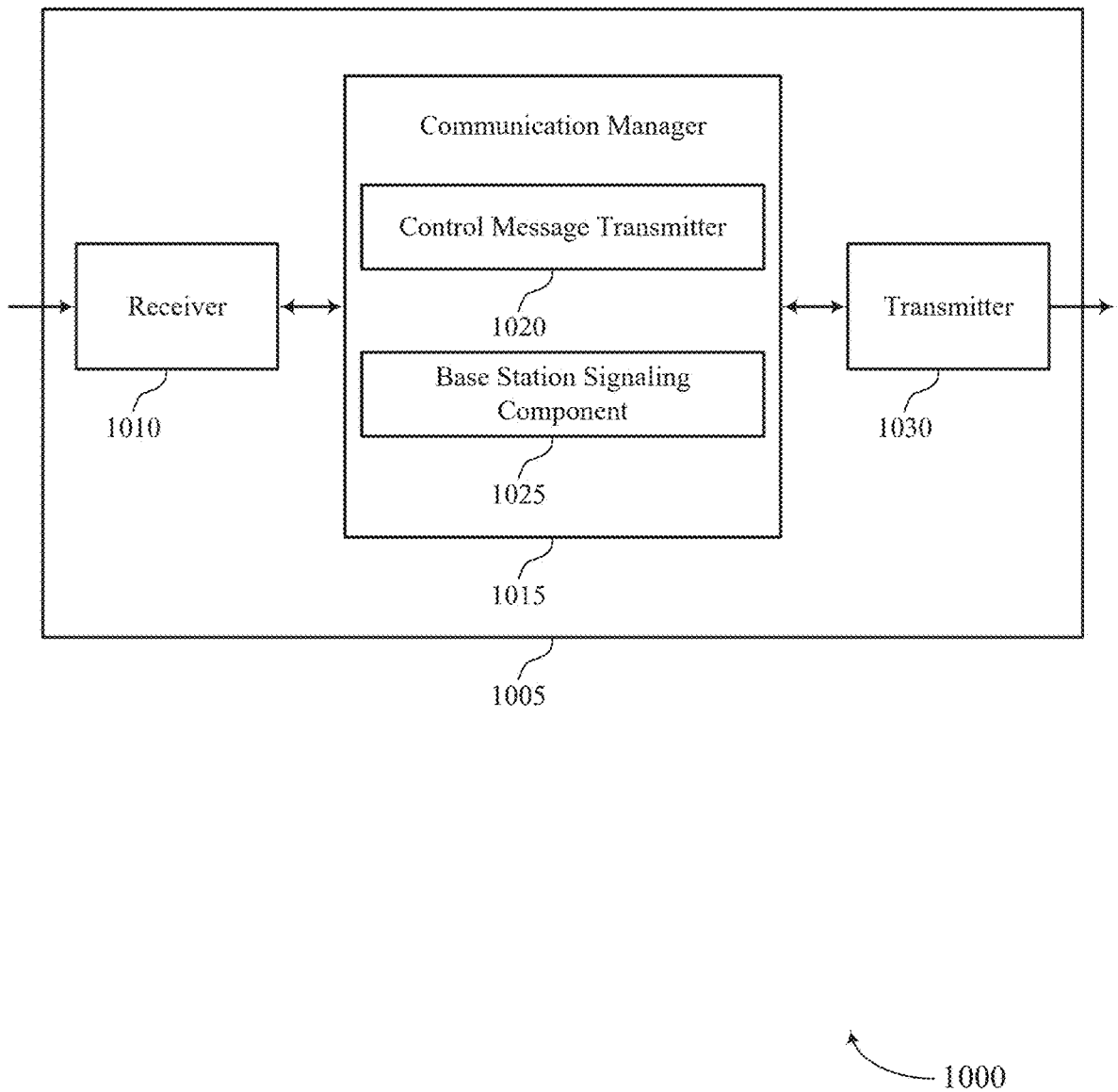

FIG. 10 shows a block diagram 1000 of a device 1005 that supports resource deactivation for interlace resource allocation in accordance with aspects of the present disclosure. The device 1005 may be an instance of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to resource deactivation for interlace resource allocation, etc.). Information may be passed on to other components of the device 1005. The receiver 1010 may be an instance of aspects of the transceiver 1220 described with reference to FIG. 12. The receiver 1010 may utilize a single antenna or a set of antennas.

The communication manager 1015 may be an instance of aspects of the communication manager 915 as described herein. The communication manager 1015 may include a control message transmitter 1020 and a base station signaling component 1025. The communication manager 1015 may be an instance of aspects of the communication manager 1210 described herein.

The control message transmitter 1020 may transmit, to a UE, a first control message that indicates to activate a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources and transmit, to the UE, a second control message that includes the resource allocation field and at least one other field after transmitting or receiving the signaling over the first one or more periodic resources, where the resource allocation field of the second control message includes a second value, and where the second control message indicates to deactivate the periodic resource grant based on the second value of the resource allocation field and a third value of the at least one other field.

The base station signaling component 1025 may receive or transmitting signaling with the UE over the first one or more periodic resources.

The transmitter 1030 may transmit signals generated by other components of the device 1005. In some aspects, the transmitter 1030 may be collocated with a receiver 1010 in a transceiver module. For instance, the transmitter 1030 may be an instance of aspects of the transceiver 1220 described with reference to FIG. 12. The transmitter 1030 may utilize a single antenna or a set of antennas.

Figure 11:
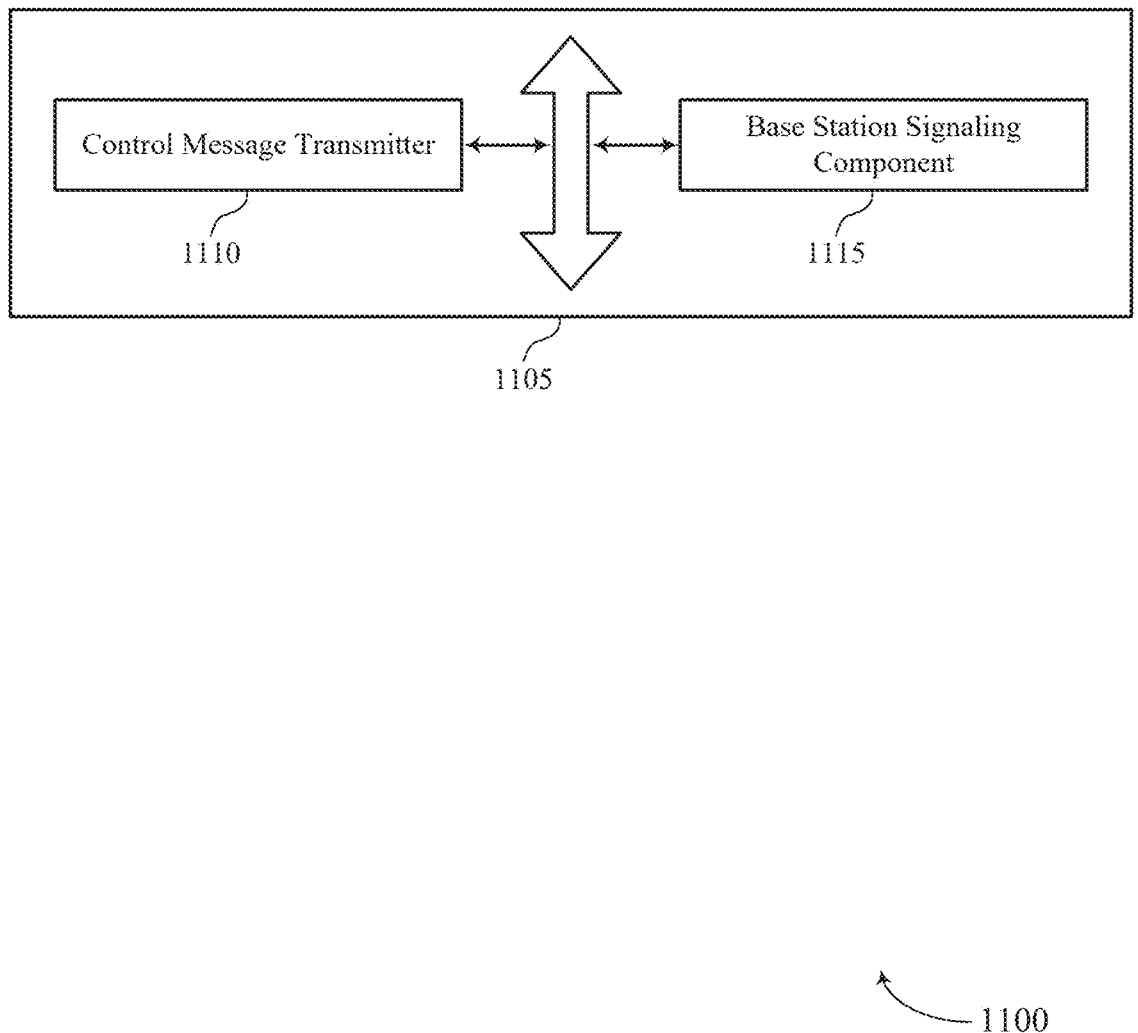
FIG. 11 shows a block diagram of a communication manager that supports resource deactivation for interlace resource allocation in accordance with aspects of the present disclosure.

FIG. 11 shows a block diagram 1100 of a communication manager 1105 that supports resource deactivation for interlace resource allocation in accordance with aspects of the present disclosure. The communication manager 1105 may be an instance of aspects of a communication manager 915, a communication manager 1015, or a communication manager 1210 described herein. The communication manager 1105 may include a control message transmitter 1110 and a base station signaling component 1115. Each of these modules may communicate, directly or indirectly, with one another (e.g., via one or more buses).

The control message transmitter 1110 may transmit, to a UE, a first control message that indicates to activate a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. In some aspects, the control message transmitter 1110 may transmit, to the UE, a second control message that includes the resource allocation field and at least one other field after transmitting or receiving the signaling over the first one or more periodic resources, where the resource allocation field of the second control message includes a second value, and where the second control message indicates to deactivate the periodic resource grant based on the second value of the resource allocation field and a third value of the at least one other field.

In some aspects, the control message transmitter 1110 may transmit, to the UE, a third control message that indicates to activate a second periodic resource grant and that includes the resource allocation field, where the resource allocation field of the third control message includes a fourth value that allocates a second one or more periodic resources of a second set of resources. In some aspects, the control message transmitter 1110 may transmit a third control message that includes the resource allocation field and the at least one other field before transmitting the second control message, where the resource allocation field of the third control message includes a fourth value and the at least one other field of the third control message includes a fifth value, and where the fourth value of the third control message is the same as the second value of the third control message, and the fifth value of the at least one other field of the third control message is different from the third value of the at least one other field of the second control message. In some cases, the second control message includes a field indicating whether to deactivate the periodic resource grant, the second periodic resource grant, or both.

The base station signaling component 1115 may receive or transmitting signaling with the UE over the first one or more periodic resources. In some aspects, the base station signaling component 1115 may receive or transmitting additional signaling over the second one or more periodic resources before transmitting the second control message. In some aspects, the base station signaling component 1115 may receive or transmitting additional signaling over the first one or more periodic resources after transmitting the third control message and before transmitting the second control message based on the fifth value of the at least one other field of the third control message being different from the third value of the at least one other field of the second control message.

Figure 12:
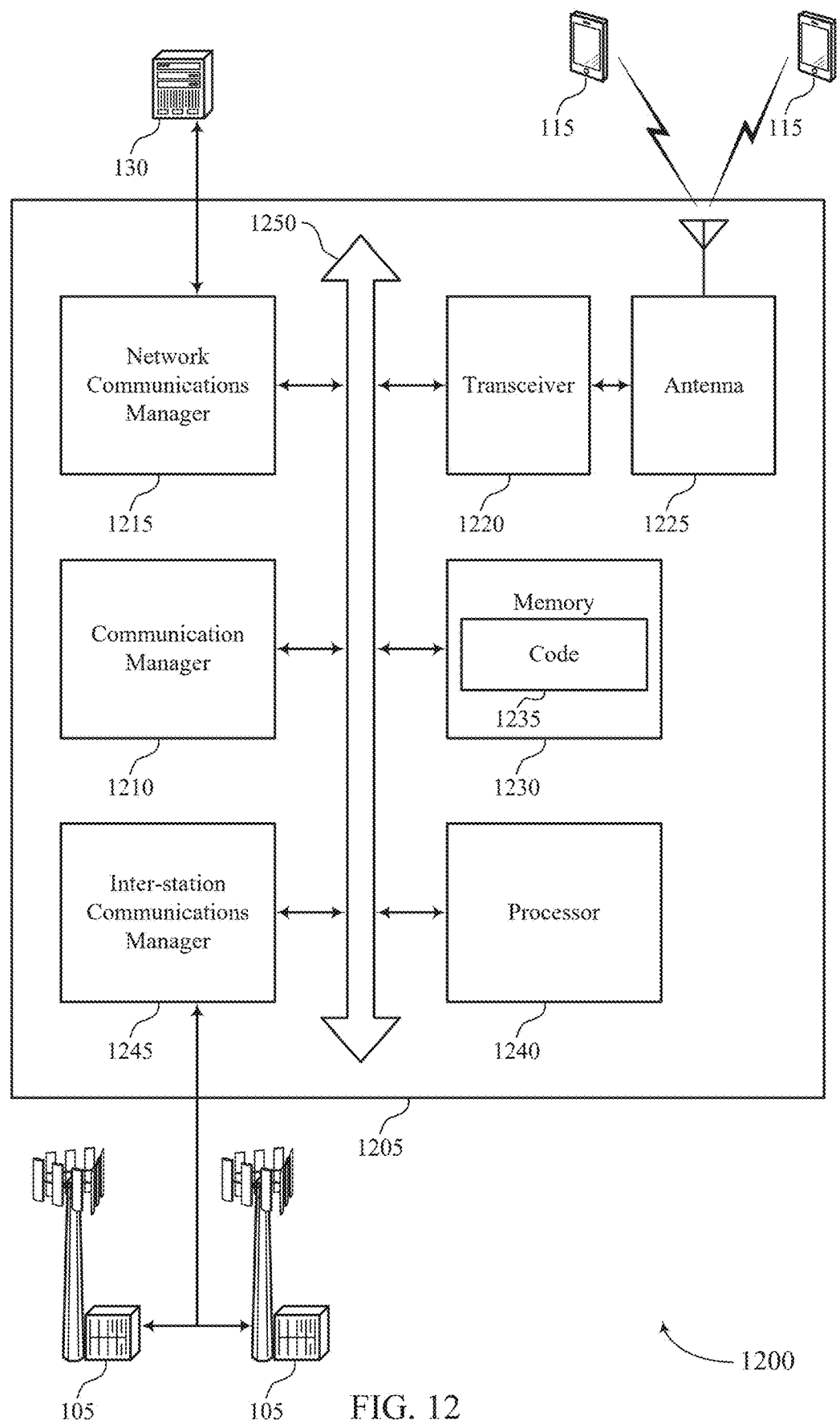
FIG. 12 shows a diagram of a system including a device that supports resource deactivation for interlace resource allocation in accordance with aspects of the present disclosure.

FIG. 12 shows a diagram of a system 1200 including a device 1205 that supports resource deactivation for interlace resource allocation in accordance with aspects of the present disclosure. The device 1205 may be an instance of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit, to a UE, a first control message that indicates to activate a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources, transmit, to the UE, a second control message that includes the resource allocation field and at least one other field after transmitting or receiving the signaling over the first one or more periodic resources, where the resource allocation field of the second control message includes a second value, and where the second control message indicates to deactivate the periodic resource grant based on the second value of the resource allocation field and a third value of the at least one other field, and receive or transmitting signaling with the UE over the first one or more periodic resources.

Additionally or alternatively, the communication manager 1210 may transmit, to a UE, a first control message that indicates to activate a first periodic resource grant, the first control message comprising a first resource allocation field associated with a first subcarrier spacing, wherein each bit of the first resource allocation field is associated with allocation of a periodic resource of a first plurality of periodic resources; transmit, to the UE, a second control message that comprises the first resource allocation field, wherein the first resource allocation field of the second control message comprises a first value, and wherein the second control message indicates to deactivate the first periodic resource grant based at least in part on the first value of the first resource allocation field and the first subcarrier spacing; transmit, to the UE, a third control message that indicates to activate a second periodic resource grant, the third control message comprising a second resource allocation field associated with a second subcarrier spacing, wherein each bit of the second resource allocation field is associated with allocation of a periodic resource of a second plurality of periodic resources; and transmit, to the UE, a fourth control message that comprises the second resource allocation field, wherein the second resource allocation field of the second control message comprises a second value different from the first value of the first resource allocation field, and wherein the fourth control message indicates to deactivate the second periodic resource grant based at least in part on the second value of the second resource allocation field and the second subcarrier spacing.

The network communications manager 1215 may manage communications with the core network (e.g., via one or more wired backhaul links). For instance, the network communications manager 1215 may manage the transfer of data communications for client devices, such as one or more UEs 115.

The transceiver 1220 may communicate bi-directionally, via one or more antennas, wired, or wireless links as described above. For instance, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting resource deactivation for interlace resource allocation).

The inter-station communications manager 1245 may manage communications with other base station 105, and may include a controller or scheduler for controlling communications with UEs 115 in cooperation with other base stations 105. For instance, the inter-station communications manager 1245 may coordinate scheduling for transmissions to UEs 115 for various interference mitigation techniques such as beamforming or joint transmission. In some aspects, the inter-station communications manager 1245 may provide an X2 interface within an LTE/LTE-A wireless communication network technology to provide communication between base stations 105.

Figure 13:
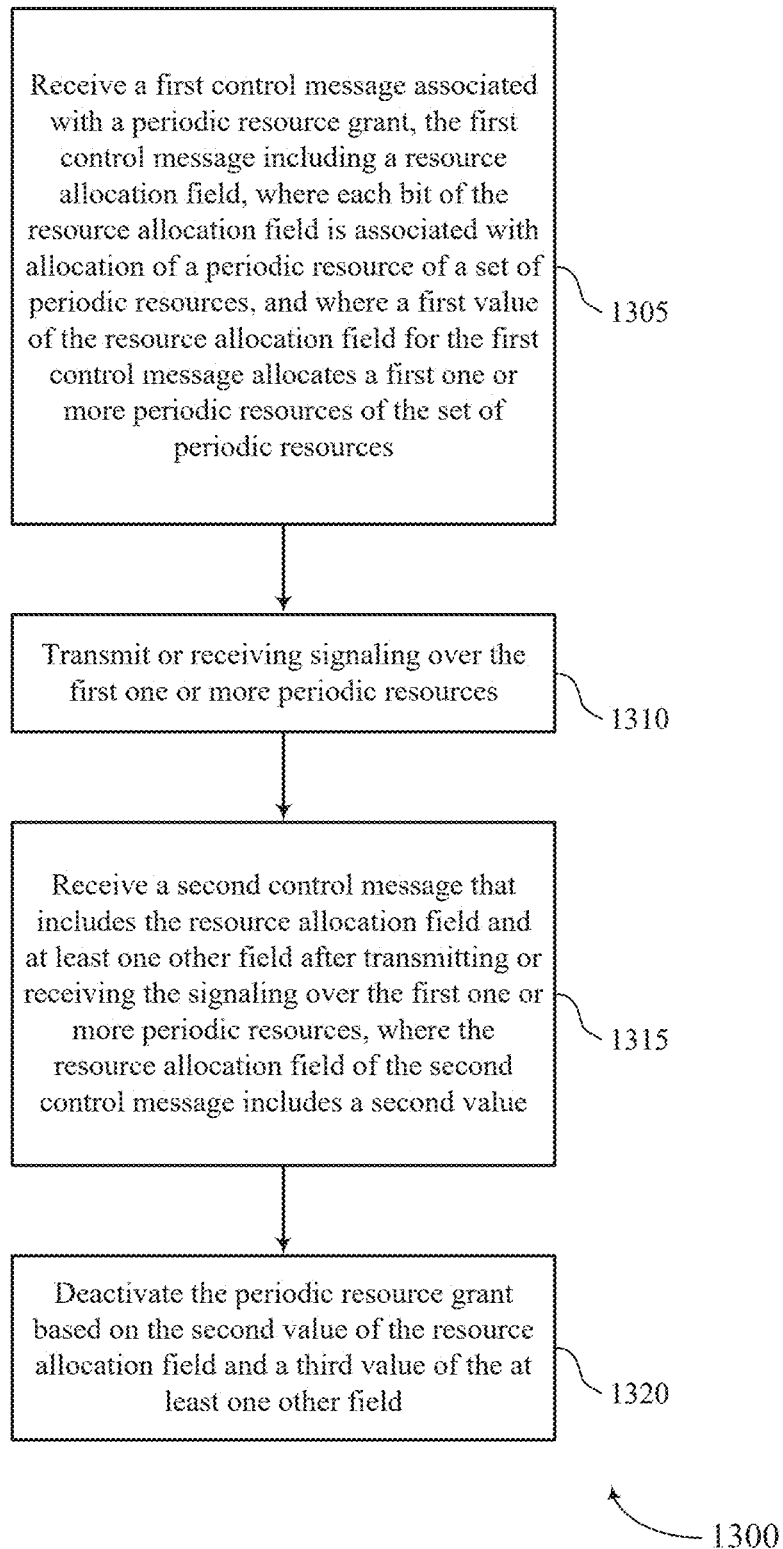
FIGS. 13 through 16 show flowcharts illustrating methods that support resource deactivation for interlace resource allocation in accordance with aspects of the present disclosure.

FIG. 13 shows a flowchart illustrating a method 1300 that supports resource deactivation for interlace resource allocation in accordance with aspects of the present disclosure. The operations of method 1300 may be implemented by a UE 115 or its components as described herein. For instance, the operations of method 1300 may be performed by a communication manager as described with reference to FIGS. 5 through 8. In some aspects, a UE may execute a set of instructions to control the functional elements of the UE to perform the described functions. Additionally or alternatively, a UE may perform aspects of the described functions using special-purpose hardware.

At 1305, the UE may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. The operations of 1305 may be performed according to the methods described herein. In some aspects, aspects of the operations of 1305 may be performed by a control message receiver as described with reference to FIGS. 5 through 8.

At 1310, the UE may transmit or receiving signaling over the first one or more periodic resources. The operations of 1310 may be performed according to the methods described herein. In some aspects, aspects of the operations of 1310 may be performed by an UE signaling component as described with reference to FIGS. 5 through 8.

At 1315, the UE may receive a second control message that includes the resource allocation field and at least one other field after transmitting or receiving the signaling over the first one or more periodic resources, where the resource allocation field of the second control message includes a second value. The operations of 1315 may be performed according to the methods described herein. In some aspects, aspects of the operations of 1315 may be performed by a control message receiver as described with reference to FIGS. 5 through 8.

At 1320, the UE may deactivate the periodic resource grant based on the second value of the resource allocation field and a third value of the at least one other field. The operations of 1320 may be performed according to the methods described herein. In some aspects, aspects of the operations of 1320 may be performed by a deactivation component as described with reference to FIGS. 5 through 8.

Figure 14:
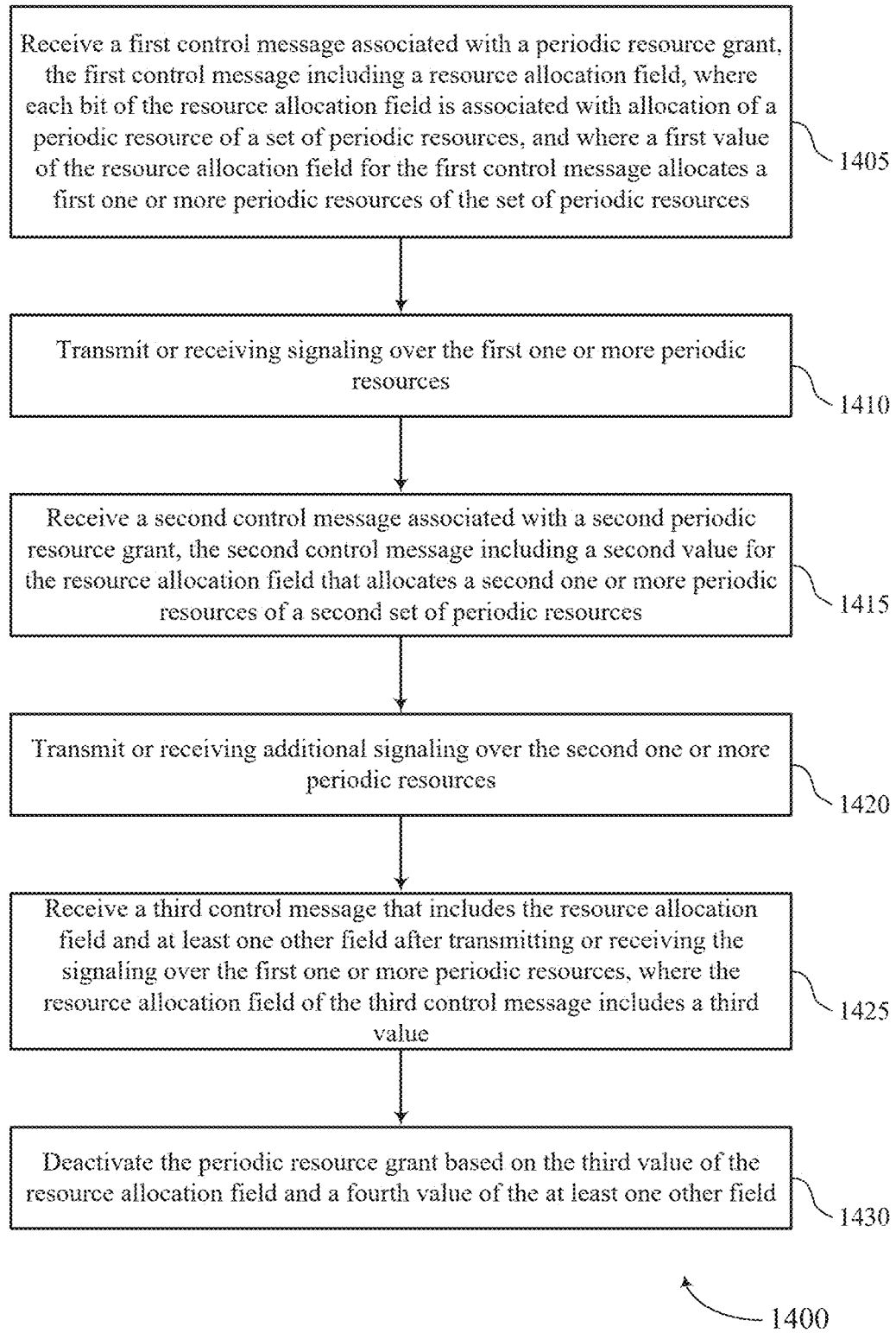

FIG. 14 shows a flowchart illustrating a method 1400 that supports resource deactivation for interlace resource allocation in accordance with aspects of the present disclosure. The operations of method 1400 may be implemented by a UE 115 or its components as described herein. For instance, the operations of method 1400 may be performed by a communication manager as described with reference to FIGS. 5 through 8. In some aspects, a UE may execute a set of instructions to control the functional elements of the UE to perform the described functions. Additionally or alternatively, a UE may perform aspects of the described functions using special-purpose hardware.

At 1405, the UE may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. The operations of 1405 may be performed according to the methods described herein. In some aspects, aspects of the operations of 1405 may be performed by a control message receiver as described with reference to FIGS. 5 through 8.

At 1410, the UE may transmit or receiving signaling over the first one or more periodic resources. The operations of 1410 may be performed according to the methods described herein. In some aspects, aspects of the operations of 1410 may be performed by an UE signaling component as described with reference to FIGS. 5 through 8.

At 1415, the UE may receive a second control message associated with a second periodic resource grant, the second control message including a second value for the resource allocation field that allocates a second one or more periodic resources of a second set of periodic resources. The operations of 1415 may be performed according to the methods described herein. In some aspects, aspects of the operations of 1415 may be performed by a control message receiver as described with reference to FIGS. 5 through 8.

At 1420, the UE may transmit or receiving additional signaling over the second one or more periodic resources. The operations of 1420 may be performed according to the methods described herein. In some aspects, aspects of the operations of 1420 may be performed by an UE signaling component as described with reference to FIGS. 5 through 8.

At 1425, the UE may receive a third control message that includes the resource allocation field and at least one other field after transmitting or receiving the signaling over the first one or more periodic resources, where the resource allocation field of the third control message includes a third value. The operations of 1425 may be performed according to the methods described herein. In some aspects, aspects of the operations of 1425 may be performed by a control message receiver as described with reference to FIGS. 5 through 8.

At 1430, the UE may deactivate the periodic resource grant based on the third value of the resource allocation field and a fourth value of the at least one other field. The operations of 1430 may be performed according to the methods described herein. In some aspects, aspects of the operations of 1430 may be performed by a deactivation component as described with reference to FIGS. 5 through 8.

Figure 15:
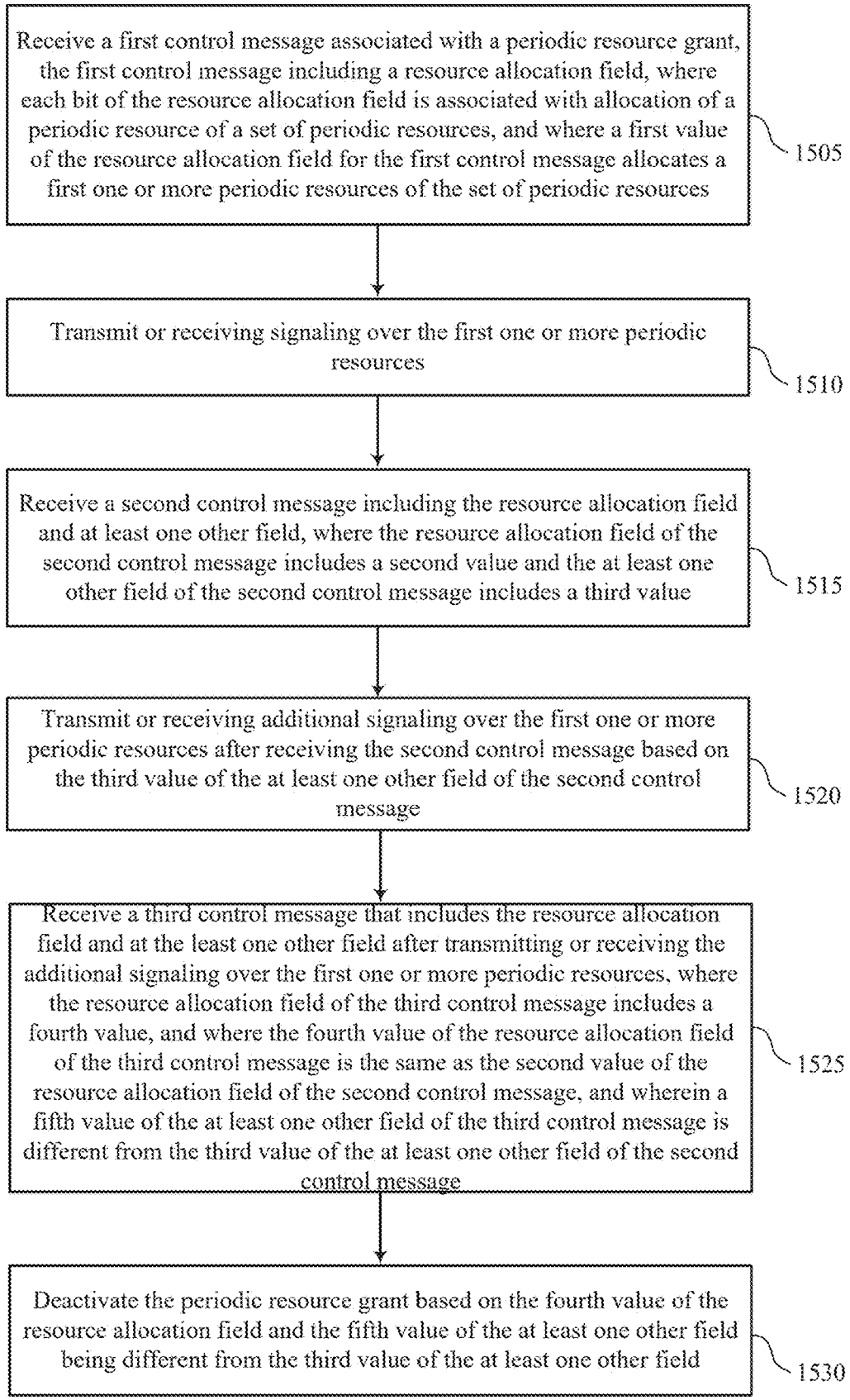

FIG. 15 shows a flowchart illustrating a method 1500 that supports resource deactivation for interlace resource allocation in accordance with aspects of the present disclosure. The operations of method 1500 may be implemented by a UE 115 or its components as described herein. For instance, the operations of method 1500 may be performed by a communication manager as described with reference to FIGS. 5 through 8. In some aspects, a UE may execute a set of instructions to control the functional elements of the UE to perform the described functions. Additionally or alternatively, a UE may perform aspects of the described functions using special-purpose hardware.

At 1505, the UE may receive a first control message associated with a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. The operations of 1505 may be performed according to the methods described herein. In some aspects, aspects of the operations of 1505 may be performed by a control message receiver as described with reference to FIGS. 5 through 8.

At 1510, the UE may transmit or receiving signaling over the first one or more periodic resources. The operations of 1510 may be performed according to the methods described herein. In some aspects, aspects of the operations of 1510 may be performed by an UE signaling component as described with reference to FIGS. 5 through 8.

At 1515, the UE may receive a second control message including the resource allocation field and at least one other field, where the resource allocation field of the second control message includes a second value and the at least one other field of the second control message includes a third value. The operations of 1515 may be performed according to the methods described herein. In some aspects, aspects of the operations of 1515 may be performed by a control message receiver as described with reference to FIGS. 5 through 8.

At 1520, the UE may transmit or receiving additional signaling over the first one or more periodic resources after receiving the second control message based on the third value of the at least one other field of the second control message. The operations of 1520 may be performed according to the methods described herein. In some aspects, aspects of the operations of 1520 may be performed by an UE signaling component as described with reference to FIGS. 5 through 8.

At 1525, the UE may receive a third control message that includes the resource allocation field and at the least one other field after transmitting or receiving the additional signaling over the first one or more periodic resources, where the resource allocation field of the third control message includes a fourth value, and where the fourth value of the resource allocation field of the third control message is the same as the second value of the resource allocation field of the second control message, and where a fifth value of the at least one other field of the third control message is different from the third value of the at least one other field of the second control message. The operations of 1525 may be performed according to the methods described herein. In some aspects, aspects of the operations of 1525 may be performed by a control message receiver as described with reference to FIGS. 5 through 8.

At 1530, the UE may deactivate the periodic resource grant based on the fourth value of the resource allocation field and the fifth value of the at least one other field being different from the third value of the at least one other field. The operations of 1530 may be performed according to the methods described herein. In some aspects, aspects of the operations of 1530 may be performed by a deactivation component as described with reference to FIGS. 5 through 8.

Figure 16:
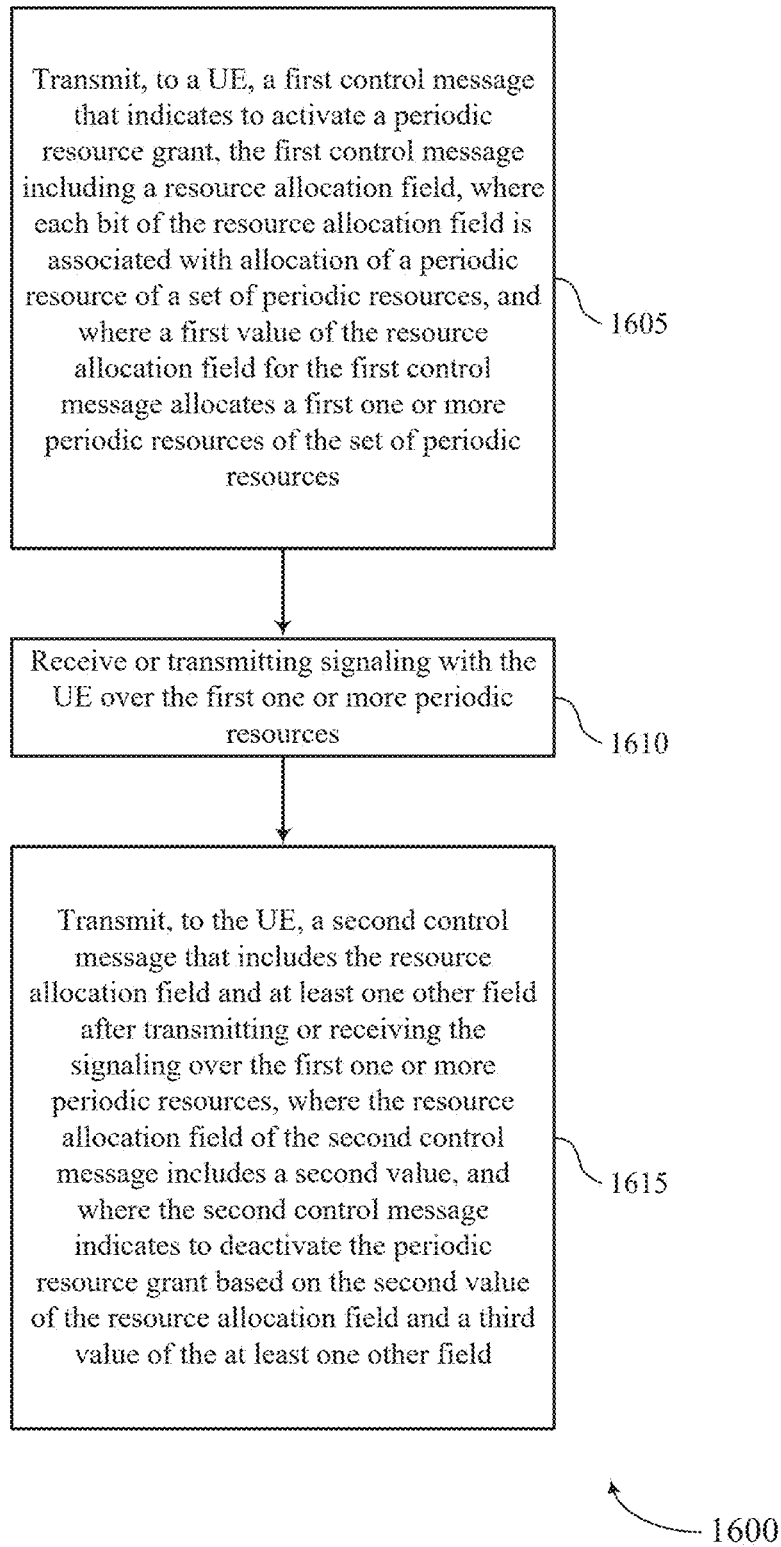

FIG. 16 shows a flowchart illustrating a method 1600 that supports resource deactivation for interlace resource allocation in accordance with aspects of the present disclosure. The operations of method 1600 may be implemented by a base station 105 or its components as described herein. For instance, the operations of method 1600 may be performed by a communication manager as described with reference to FIGS. 9 through 12. In some aspects, a base station may execute a set of instructions to control the functional elements of the base station to perform the described functions. Additionally or alternatively, a base station may perform aspects of the described functions using special-purpose hardware.

At 1605, the base station may transmit, to a UE, a first control message that indicates to activate a periodic resource grant, the first control message including a resource allocation field, where each bit of the resource allocation field is associated with allocation of a periodic resource of a set of periodic resources, and where a first value of the resource allocation field for the first control message allocates a first one or more periodic resources of the set of periodic resources. The operations of 1605 may be performed according to the methods described herein. In some aspects, aspects of the operations of 1605 may be performed by a control message transmitter as described with reference to FIGS. 9 through 12.

At 1610, the base station may receive or transmitting signaling with the UE over the first one or more periodic resources. The operations of 1610 may be performed according to the methods described herein. In some aspects, aspects of the operations of 1610 may be performed by a base station signaling component as described with reference to FIGS. 9 through 12.

At 1615, the base station may transmit, to the UE, a second control message that includes the resource allocation field and at least one other field after transmitting or receiving the signaling over the first one or more periodic resources, where the resource allocation field of the second control message includes a second value, and where the second control message indicates to deactivate the periodic resource grant based on the second value of the resource allocation field and a third value of the at least one other field. The operations of 1615 may be performed according to the methods described herein. In some aspects, aspects of the operations of 1615 may be performed by a control message transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of illustration, and LTE, LTE-A, LTE-A Pro, or NR terminology may be used in much of the description, the techniques described herein are applicable beyond LTE, LTE-A, LTE-A Pro, or NR networks. For instance, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For instance, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For instance, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of illustration, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For instance, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for instance, a list of at least one of A, B, or C means A or B or C or AB or AC or BC or ABC (i.e., A and B and C). Also, as used herein, the phrase "based on" shall not be construed as a reference to a closed set of conditions. For instance, a step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes illustrative configurations and does not represent all the aspects that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein, but is to be accorded the broadest scope consistent with the principles and novel features disclosed herein.

What is claimed is:

1. A method for wireless communication, comprising:
   receiving a first control message allocating a first periodic resource grant and comprising a first resource allocation field associated with a first subcarrier spacing, wherein each bit of the first resource allocation field is associated with allocation of a periodic resource of a first plurality of periodic resources;
   receiving a second control message that comprises the first resource allocation field, wherein the first resource allocation field of the second control message comprises a first value, each bit of the first value corresponding to a deallocated condition;
   deactivating the first periodic resource grant based at least in part on the first value of the first resource allocation field and in accordance with the first subcarrier spacing;
   receiving a third control message allocating a second periodic resource grant and comprising a second resource allocation field associated with a second subcarrier spacing, wherein each bit of the second resource allocation field is associated with allocation of a periodic resource of a second plurality of periodic resources;
   receiving a fourth control message that comprises the second resource allocation field, wherein the second resource allocation field of the fourth control message comprises a second value different from the first value of the first resource allocation field, each bit of the second value corresponding to an allocated condition; and
   deactivating the second periodic resource grant based at least in part on the second value of the second resource allocation field and in accordance with the second subcarrier spacing.

2. The method of claim 1, wherein a third value of the first resource allocation field for the first control message allocates a first one or more periodic resources of the first plurality of periodic resources, the method further comprising:
   receiving a fifth control message associated with a third periodic resource grant, the fifth control message comprising a fourth value for the first resource allocation field that allocates a second one or more periodic resources of a third plurality of periodic resources; and
   transmitting or receiving signaling over the second one or more periodic resources.

3. The method of claim 2, further comprising:
   identifying a field of the second control message indicating whether to deactivate the first periodic resource grant, the third periodic resource grant, or both, wherein the deactivating the first periodic resource grant is based at least in part on the field.

4. The method of claim 3, wherein a first one of the first one or more periodic resources and the second one or more periodic resources comprise downlink semi-persistent scheduling resources and wherein a second one of the first one or more periodic resources and the second one or more periodic resources comprise uplink configured-grant resources.

5. The method of claim 1, wherein the second control message comprises at least one other field that comprises a third value, the method further comprising:
   receiving a fifth control message comprising the first resource allocation field and the at least one other field, wherein the first resource allocation field of the fifth control message comprises a fourth value and the at least one other field of the fifth control message comprises a fifth value, and wherein the fourth value of the first resource allocation field of the fifth control message is the same as the first value of the first resource allocation field of the second control message, and the fifth value of the at least one other field of the fifth control message is different from the third value of the at least one other field of the second control message; and
   transmitting or receiving signaling associated with the first periodic resource grant after receiving the fifth control message and before receiving the second control message based at least in part on the fifth value of the at least one other field of the fifth control message being different from the third value of the at least one other field of the second control message.

6. The method of claim 5, wherein the at least one other field comprises a hybrid automatic repeat request process number field, a redundancy version field, a new data indicator field, a transmission power control field, a time-domain assignment field, or any combination thereof.

7. The method of claim 1, wherein the deactivating the first periodic resource grant is based at least in part on each bit of the first value of the first resource allocation field of the second control message corresponding to an allocated condition for the respective periodic resource of the first plurality of periodic resources.

8. The method of claim 1, wherein the deactivating the first periodic resource grant is based at least in part on a type of resource allocation associated with the first resource allocation field.

9. The method of claim 1, wherein the deactivating the first periodic resource grant is based at least in part on the second control message comprising a configured scheduling radio network temporary identifier scrambled with a cyclic redundancy check.

10. The method of claim 1, wherein the first control message and the second control message each comprise downlink control information (DCI) that schedules an uplink transmission or a downlink transmission.

11. The method of claim 10, wherein each periodic resource of the first plurality of periodic resources and each periodic resource of the second plurality of periodic resources comprises an interlaced resource.

12. A method for wireless communication, comprising:
transmitting, to a user equipment (UE), a first control message that indicates to activate a first periodic resource grant, the first control message comprising a first resource allocation field associated with a first subcarrier spacing, wherein each bit of the first resource allocation field is associated with allocation of a periodic resource of a first plurality of periodic resources;
transmitting, to the UE, a second control message that comprises the first resource allocation field, wherein the first resource allocation field of the second control message comprises a first value, each bit of the first value corresponding to a deallocated condition, and wherein the second control message indicates to deactivate the first periodic resource grant based at least in part on the first value of the first resource allocation field and in accordance with the first subcarrier spacing;
transmitting, to the UE, a third control message that indicates to activate a second periodic resource grant, the third control message comprising a second resource allocation field associated with a second subcarrier spacing, wherein each bit of the second resource allocation field is associated with allocation of a periodic resource of a second plurality of periodic resources; and
transmitting, to the UE, a fourth control message that comprises the second resource allocation field, wherein the second resource allocation field of the second control message comprises a second value different from the first value of the first resource allocation field, each bit of the second value corresponding to an allocated condition, and wherein the fourth control message indicates to deactivate the second periodic resource grant based at least in part on the second value of the second resource allocation field and in accordance with the second subcarrier spacing.

13. The method of claim 12, wherein a third value of the first resource allocation field for the first control message allocates a first one or more periodic resources of the first plurality of periodic resources, the method further comprising:
transmitting, to the UE, a fifth control message that indicates to activate a third periodic resource grant and that comprises the first resource allocation field, wherein the first resource allocation field of the fifth control message comprises a fourth value that allocates a second one or more periodic resources of a second plurality of resources; and
receiving or transmitting signaling over the second one or more periodic resources before transmitting the second control message.

14. The method of claim 13, wherein the second control message comprises a field indicating whether to deactivate the first periodic resource grant, the third periodic resource grant, or both.

15. The method of claim 14, wherein a first one of the first one or more periodic resources and the second one or more periodic resources comprise downlink semi-persistent scheduling resources and wherein the other a second one of the first one or more periodic resources and the second one or more periodic resources comprise uplink configured-grant resources.

16. The method of claim 12, wherein the second control message comprises at least one other field that comprises a third value, the method further comprising:
transmitting a fifth control message that comprises the first resource allocation field and the at least one other field before transmitting the second control message, wherein the first resource allocation field of the fifth control message comprises a fourth value and the at least one other field of the fifth control message comprises a fifth value, and wherein the fourth value of the fifth control message is the same as the first value of the second control message, and the fifth value of the at least one other field of the fifth control message is different from the third value of the at least one other field of the second control message; and
receiving or transmitting signaling associated with the first periodic resource grant after transmitting the fifth control message and before transmitting the second control message based at least in part on the fifth value of the at least one other field of the fifth control message being different from the third value of the at least one other field of the second control message.

17. The method of claim 12, wherein the second control message indicates to deactivate the first periodic resource grant based at least in part on each bit of the first value of the first resource allocation field of the second control message corresponding to an allocated condition for the respective periodic resource of the first plurality of periodic resources.

18. The method of claim 12, wherein the second control message indicates to deactivate the first periodic resource grant based at least in part on a type of resource allocation associated with the first resource allocation field.

19. The method of claim 12, wherein the second control message indicates to deactivate the first periodic resource grant based at least in part on the second control message comprising a configured scheduling radio network temporary identifier scrambled with a cyclic redundancy check.

20. The method of claim 12, wherein the first control message and the second control message each comprise downlink control information (DCI) that schedules an uplink transmission or a downlink transmission.

21. The method of claim 20, wherein each periodic resource of the first plurality of periodic resources and each periodic resource of the second plurality of periodic resources comprises an interlaced resource.

22. An apparatus for wireless communication, comprising:
means for receiving a first control message allocating a first periodic resource grant and comprising a first resource allocation field associated with a first subcarrier spacing, wherein each bit of the first resource allocation field is associated with allocation of a periodic resource of a first plurality of periodic resources;
means for receiving a second control message that comprises the first resource allocation field, wherein the first resource allocation field of the second control message comprises a first value, each bit of the first value corresponding to a deallocated condition;
means for deactivating the first periodic resource grant based at least in part on the first value of the first resource allocation field and in accordance with the first subcarrier spacing;
means for receiving a third control message allocating a second periodic resource grant and comprising a second resource allocation field associated with a second subcarrier spacing, wherein each bit of the second resource allocation field is associated with allocation of a periodic resource of a second plurality of periodic resources;
means for receiving a fourth control message that comprises the second resource allocation field, wherein the second resource allocation field of the fourth control message comprises a second value different from the first value of the first resource allocation field, each bit of the second value corresponding to an allocated condition; and
means for deactivating the second periodic resource grant based at least in part on the second value of the second resource allocation field and in accordance with the second subcarrier spacing.

23. The apparatus of claim 22, wherein a third value of the first resource allocation field for the first control message allocates a first one or more periodic resources of the first plurality of periodic resources, and wherein the apparatus further comprises:
means for receiving a fifth control message associated with a third periodic resource grant, the fifth control message comprising a fourth value for the first resource allocation field that allocates a second one or more periodic resources of a third plurality of periodic resources; and
means for transmitting or receiving signaling over the second one or more periodic resources.

24. The apparatus of claim 23, further comprising:
means for identifying a field of the second control message indicating whether to deactivate the first periodic resource grant, the third periodic resource grant, or both, wherein the deactivating the first periodic resource grant is based at least in part on the field.

25. The apparatus of claim 24, wherein a first one of the first one or more periodic resources and the second one or more periodic resources comprise downlink semi-persistent scheduling resources and wherein the other a second one of the first one or more periodic resources and the second one or more periodic resources comprise uplink configured-grant resources.

26. An apparatus for wireless communication, comprising:
means for transmitting, to a user equipment (UE), a first control message that indicates to activate a first periodic resource grant, the first control message comprising a first resource allocation field associated with a first subcarrier spacing, wherein each bit of the first resource allocation field is associated with allocation of a periodic resource of a first plurality of periodic resources;
means for transmitting, to the UE, a second control message that comprises the first resource allocation field, wherein the first resource allocation field of the second control message comprises a first value, each bit of the first value corresponding to a deallocated condition, and wherein the second control message indicates to deactivate the first periodic resource grant based at least in part on the first value of the first resource allocation field and in accordance with the first subcarrier spacing;
means for transmitting, to the UE, a third control message that indicates to activate a second periodic resource grant, the third control message comprising a second resource allocation field associated with a second subcarrier spacing, wherein each bit of the second resource allocation field is associated with allocation of a periodic resource of a second plurality of periodic resources; and
means for transmitting, to the UE, a fourth control message that comprises the second resource allocation field, wherein the second resource allocation field of the second control message comprises a second value different from the first value of the first resource allocation field, each bit of the second value corresponding to an allocated condition, and wherein the fourth control message indicates to deactivate the second periodic resource grant based at least in part on the second value of the second resource allocation field and in accordance with the second subcarrier spacing.

27. The apparatus of claim 26, wherein a third value of the first resource allocation field for the first control message allocates a first one or more periodic resources of the first plurality of periodic resources, and wherein the apparatus further comprises:
means for transmitting, to the UE, a fifth control message that indicates to activate a third periodic resource grant and that comprises the first resource allocation field, wherein the first resource allocation field of the fifth control message comprises a fourth value that allocates a second one or more periodic resources of a second plurality of resources; and
means for receiving or transmitting signaling over the second one or more periodic resources before transmitting the second control message.

28. The apparatus of claim 27, wherein the second control message comprises a field indicating whether to deactivate the first periodic resource grant, the third periodic resource grant, or both.

* * * * *